US012760682B2

(12) United States Patent
Ertas et al.

(10) Patent No.: US 12,760,682 B2
(45) Date of Patent: Oct. 13, 2026

(54) GEARBOX ASSEMBLY WITH LUBRICANT EXTRACTION VOLUME RATIO

(71) Applicants: General Electric Company, Evendale, OH (US); GE Avio S.r.l., Rivalta di Torino (IT)

(72) Inventors: Bugra H. Ertas, Niskayuna, NY (US); Xiaohua Zhang, Glenville, NY (US); Miriam Manzoni, Rivalta di Torino (IT); Flavia Turi, Bari (IT); Andrea Piazza, Turin (IT); Arthur W. Sibbach, Boxford, MA (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 19/003,582

(22) Filed: Dec. 27, 2024

(65) Prior Publication Data

US 2025/0137529 A1 May 1, 2025

Related U.S. Application Data

(63) Continuation-in-part of application No. 18/068,017, filed on Dec. 19, 2022.

(30) Foreign Application Priority Data

Jun. 22, 2022 (IT) ........................ 102022000013213

(51) Int. Cl.
*F02C 7/36* (2006.01)
*F02C 7/06* (2006.01)
(Continued)

(52) U.S. Cl.
CPC .................. *F02C 7/06* (2013.01); *F02C 7/36* (2013.01); *F16H 57/0423* (2013.01);
(Continued)

(58) Field of Classification Search
CPC ..... F16H 57/0434–0435; F16H 57/045; F16H 57/0441–0443; F16H 57/0442–0443;
(Continued)

(56) References Cited

U.S. PATENT DOCUMENTS 4,569,196 A 2/1986 Waddington et al.
4,629,033 A 12/1986 Moore et al.
(Continued)

FOREIGN PATENT DOCUMENTS

CA 3040146 A1 * 10/2019 ............. F01D 25/20
CN 109404134 B 6/2020
(Continued)

OTHER PUBLICATIONS

Farless, Paul, Noria Corporation, How Important is Oil Level Control in Optimizing Bearing, Gear and Engine Reliability?, Jun. 30, 2022, Machinery Lubrication via Wayback Machine,https://web.archive.org/web/20220630123552/https://www.machinerylubrication.com/Read/32150/how-important-is-oil-level-con (Year: 2022).*
(Continued)

*Primary Examiner* — Stephanie Sebasco Cheng
(74) *Attorney, Agent, or Firm* — Venable LLP; Peter T. Hrubiec; Michele V. Frank

(57) ABSTRACT

A gas turbine engine includes a gearbox assembly that includes a gearbox and a gutter for collecting a gearbox lubricant scavenge flow from the gearbox. The gutter is characterized by a lubricant extraction volume ratio between 0.01 and 0.3. The lubricant extraction volume ratio defined by:

$$\frac{V_G}{V_{GB}} \cdot V_G$$

(Continued)

is a gutter volume of the gutter and $V_{GB}$ is a gearbox volume. The gas turbine engine includes a lubrication system that includes a lubricant tank that stores lubricant, one or more primary gearbox lubricant supply lines, one or more secondary gearbox lubricant supply lines, and a lubricant pump for supplying the lubricant to the gearbox assembly through the primary gearbox lubricant supply lines and the secondary gearbox lubricant supply lines. The lubrication system modulates a mass flow rate of the lubricant to the gearbox assembly through the primary gearbox lubricant supply lines or the secondary gearbox lubricant supply lines.

18 Claims, 10 Drawing Sheets

(51) Int. Cl.
*F16H 57/02* (2012.01)
*F16H 57/04* (2010.01)
*H02K 7/116* (2006.01)

(52) U.S. Cl.
CPC ..... *F16H 57/0435* (2013.01); *F16H 57/0436* (2013.01); *F16H 57/0442* (2013.01); *F16H 57/045* (2013.01); *F16H 57/0471* (2013.01); *F16H 57/0475* (2013.01); *F16H 57/0476* (2013.01); *F16H 2057/02034* (2013.01); *F16H 2057/02073* (2013.01); *F16H 57/0443* (2013.01); *F16H 57/0482* (2013.01); *F16H 57/0486* (2013.01); *H02K 7/116* (2013.01)

(58) Field of Classification Search
CPC ... F16H 57/0445; H02K 9/19–20; F02C 7/06; F02C 7/36; F02C 3/107; F02C 3/113; F01D 15/12; F01D 25/20; F01D 25/125; F01D 25/16; F01D 15/10; F01D 25/18–22; F05D 2260/40311; F05D 2260/98; F05D 2240/50; F05D 2220/76–77
See application file for complete search history.

(56) References Cited

U.S. PATENT DOCUMENTS 4,856,273 A 8/1989 Murray
5,067,454 A 11/1991 Waddington et al.
6,058,694 A 5/2000 Ackerman et al.
6,363,707 B2 4/2002 Junquera
8,215,454 B2 * 7/2012 Portlock .................. F02C 7/36 184/6.12
8,672,095 B2 3/2014 Charier et al.
8,833,086 B2 * 9/2014 Parnin ................ F16H 57/0486 60/39.08
8,844,257 B2 9/2014 Parnin et al.
9,404,381 B2 * 8/2016 NguyenLoc ........ F16H 57/0441
9,404,420 B2 8/2016 Gallet et al.
9,790,804 B2 10/2017 Lepretre
9,810,113 B2 11/2017 Krug
9,909,453 B2 3/2018 Fang et al.
10,082,105 B2 9/2018 McCune et al.
10,145,276 B2 * 12/2018 Parnin .................... F01M 11/10
10,247,020 B2 * 4/2019 McCune ................. F01D 9/065
10,287,915 B2 5/2019 McCune
10,364,881 B2 7/2019 Pikovsky et al.
10,436,067 B2 10/2019 Dolman et al.
10,513,949 B2 * 12/2019 Parnin ................ F16H 57/0442
10,605,104 B2 * 3/2020 Schwarz .................. F02C 7/14
10,605,351 B2 3/2020 Sheridan et al.
10,794,467 B2 * 10/2020 Kurz-Hardjosoekatmo ................ F16H 57/0457
10,823,005 B2 11/2020 Fang et al.
11,060,417 B2 7/2021 McCune
11,066,945 B2 7/2021 McCune
11,203,974 B2 12/2021 Sheridan
11,236,637 B2 2/2022 Parnin et al.
11,268,453 B1 3/2022 Desjardins et al.
11,280,221 B2 3/2022 Dolman et al.
11,339,725 B2 5/2022 Simon et al.
11,391,363 B2 * 7/2022 Sbabo ................ F16H 57/0445
11,549,399 B2 1/2023 Dolman et al.
11,719,113 B2 * 8/2023 Muldoon ............. F01D 25/162 60/782
11,719,127 B2 8/2023 Davis et al.
11,808,214 B2 * 11/2023 Payyoor .................... F02C 7/06
11,959,589 B2 * 4/2024 Patel ........................ H02K 9/19
2013/0319006 A1 12/2013 Parnin et al.
2015/0089918 A1 4/2015 Valva et al.
2015/0267618 A1 9/2015 Schwarz et al.
2016/0032773 A1 2/2016 James et al.
2017/0051823 A1 2/2017 Pikovsky et al.
2017/0108110 A1 4/2017 Sheridan
2019/0113127 A1 4/2019 Gravina
2019/0170004 A1 6/2019 McCune
2019/0271236 A1 9/2019 McCune
2019/0316488 A1 * 10/2019 Menczykalski ........... F02C 7/06
2019/0316522 A1 * 10/2019 Menczykalski ........... F02C 7/32
2019/0323597 A1 10/2019 Sheridan
2020/0165980 A1 5/2020 Di Giovanni
2020/0200042 A1 6/2020 Charrier et al.
2021/0017910 A1 1/2021 Spruce
2021/0148453 A1 5/2021 Pennacino et al.
2021/0222767 A1 7/2021 Jabido et al.
2021/0324762 A1 10/2021 Anglin et al.
2022/0316584 A1 10/2022 Jacquemard et al.
2022/0397040 A1 12/2022 Molesini et al.
2023/0021913 A1 1/2023 Levisse et al.
2023/0101143 A1 * 3/2023 Williams .................. F02C 7/06 184/6.11
2023/0313738 A1 * 10/2023 Zhang ....................... F02C 7/06 184/6.11
2023/0349326 A1 * 11/2023 Turnquist .................. F02C 7/36
2024/0093618 A1 3/2024 Picard

FOREIGN PATENT DOCUMENTS

EP 2148114 A1 1/2010
EP 2980368 A1 2/2016
EP 2855859 B1 1/2019
FR 3086003 B1 3/2020
FR 3096396 A1 * 11/2020 ............ F01D 25/18
FR 3127024 A1 3/2023
FR 3127025 A1 3/2023
FR 3129436 A1 5/2023
FR 3129690 A1 6/2023
FR 3130747 A1 6/2023
FR 3130874 A1 6/2023
FR 3130875 A1 6/2023
FR 3130877 A1 6/2023
FR 3130895 A1 6/2023
WO 2015147949 A2 10/2015

OTHER PUBLICATIONS

Clarivate Translation of Foreign Reference: Ertas IT202200013213A1 published Dec. 22, 2023 (Year: 2023).*
Howe et al., "Advanced Gearbox Technology: Advanced Counter-Rotating Gearbox Detailed Design Report," NASA Contractor Report No. 180883, Pratt & Whitney Aircraft, United Technologies Corporation (1988).

* cited by examiner

GEARBOX ASSEMBLY WITH LUBRICANT EXTRACTION VOLUME RATIO

CROSS REFERENCE TO RELATED APPLICATIONS

The present application is a continuation-in-part application of U.S. patent application Ser. No. 18/068,017, filed Dec. 19, 2022, which claims the benefit of Italian Patent Application No. 102022000013213, filed on Jun. 22, 2022, the entire contents of which are incorporated by reference in their entireties.

TECHNICAL FIELD

The present disclosure relates to a gearbox assembly for an engine, for example, a gas turbine engine for an aircraft.

BACKGROUND

Lubricant is used in a power gearbox to lubricate gears and rotating parts in the gearbox. Lubricant may be supplied to lubricate the mesh between the gears. As the gears of the gearbox assembly rotate during operation, the lubricant is expelled outwardly. The lubricant is captured by a gutter.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
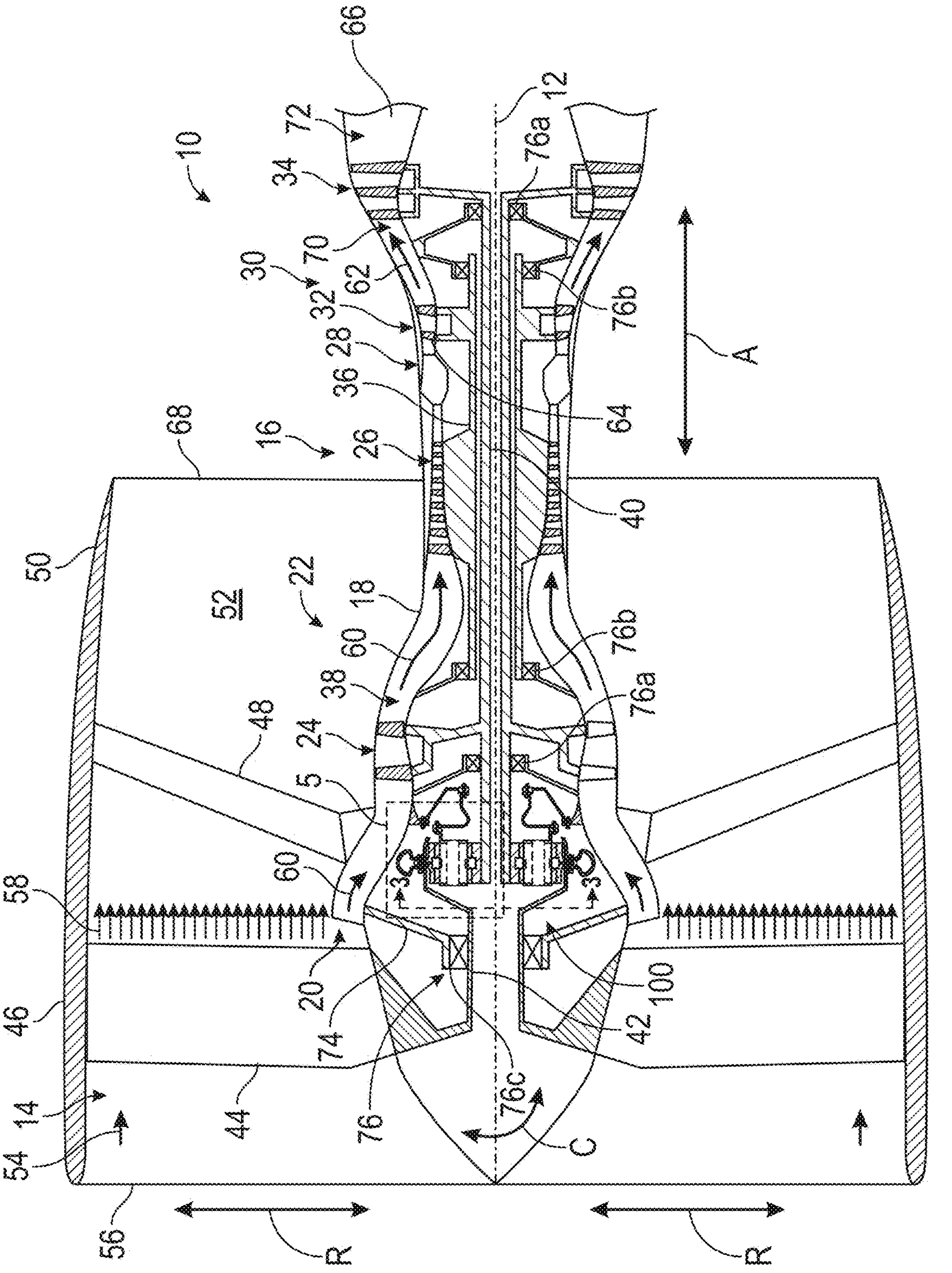
FIG. 1 illustrates a schematic, cross-sectional view of an engine, taken along a centerline axis of the engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the terms "mesh," "meshing," or "intermesh" refer to a location between two gears at which gear teeth of the two gears become intertwined, or otherwise become mated.

As used herein, "friction" of two rotating components occurs at the interface of contact between the two rotating components and is the result of the contact of the two rotating components sliding and rolling with respect to each other. The friction is a function of the geometrical configuration and operative conditions (e.g., transmitted power through the two rotating components).

As used herein, "windage" of a rotating component occurs due to the interaction of the rotating component with the fluids (e.g., air or lubricant) surrounding the rotating component. The windage is caused by drag of the rotating component within the fluids and is a function of the geometrical configuration and operative conditions. One of the main drivers of the windage is the amount of lubricant interacting with the gears.

As used herein, a "gearbox efficiency" is a ratio of output power from the gearbox assembly to input power into the gearbox assembly. In particular, the gearbox efficiency is the ratio of the output power through the output shaft to the input power from the input shaft. In some embodiments, the input shaft is a shaft of the turbo-engine (e.g., a low-pressure shaft) and the output shaft is a propulsor shaft of the propulsor.

As used herein, the terms "low," "mid" (or "mid-level"), and "high," or their respective comparative degrees (e.g., "lower" and "higher", where applicable), when used with compressor, combustor, turbine, shaft, propulsor, or turbofan engine components, each refers to relative pressures, relative speeds, relative temperatures, or relative power outputs within a gas turbine engine unless otherwise specified. For example, a "low-power" setting defines the gas turbine engine, or the combustor, configured to operate at a power output lower than a "high-power" setting of the gas turbine engine or the combustor, and a "mid-power" setting defines the gas turbine engine, or the combustor, configured to operate at a power output higher than a "low-power" setting and lower than a "high-power" setting. The terms "low," "mid" (or "mid-level") or "high" may additionally, or alternatively, be relative to minimum allowable speeds, pressures, or temperatures. The terms "low," "mid" (or "mid-level") or "high" may be understood to be relative to minimum or maximum allowable speeds, pressures, or temperatures relative to normal, desired, steady state, etc., operation of the gas turbine engine. A mission cycle for a gas turbine engine includes, for example, a low-power operation, a mid-power operation, and a high-power operation. Low-power operation includes, for example, engine start, idle, taxiing, and approach. Mid-power operation includes, for example, cruise. High-power operation includes, for example, takeoff and climb.

The various power levels of the turbofan engine are defined as a percentage of a sea level static (SLS) maximum engine rated thrust. Low-power operation includes, for example, less than thirty percent (30%) of the SLS maximum engine rated thrust of the gas turbine engine. Mid-power operation includes, for example, thirty percent (30%) to eighty-five percent (85%) of the SLS maximum engine rated thrust of the gas turbine engine. High-power operation includes, for example, greater than eighty-five percent (85%) of the SLS maximum engine rated thrust of the gas turbine engine. The values of the thrust for each of the low-power operation, the mid-power operation, and the high-power operation of the gas turbine engine are exemplary only, and other values of the thrust can be used to define the low-power operation, the mid-power operation, and the high-power operation.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A gas turbine engine can be configured as a geared engine. Geared engines include a power gearbox utilized to transfer power from a turbine shaft to a fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft.

In either configuration, it is desired to increase efficiency. There are several effects that can negatively impact a gearbox's efficiency. For example, gearboxes experience windage across rotating components (e.g., in the bearing, in rolling surfaces, in the gears), that is, shear and drag forces are generated across the gears, pins, and bearings of the gearboxes. In another example, the rotating components of the gearbox experience friction losses due to the relative rotation between components. The windage and friction losses reduce the efficiency of the gearbox. In addition to reducing efficiency, windage and friction losses contribute to heat generation in gearboxes. The relative rotating surfaces and force transmission between the gears also generates heat in the gearboxes.

When a gearbox operates at higher efficiency a greater percentage of the input power from the LP shaft is transferred to the fan shaft. To improve gearbox efficiency, lubrication is provided to the gearboxes to provide a protective film at the rolling contact surfaces, to lubricate the components, and to remove heat from the gearbox. Lubrication supplied to the gearbox, however, needs to be removed from the gearbox. Buildup of lubrication in the gearbox may reduce efficiency and may not remove the heat from the gearbox. Furthermore, allowing the lubrication in the gearbox to enter other components of the engine may negatively impact operation of the other components. One way to remove lubrication from the gearbox is to scavenge the lubrication through a gutter. The gutter collects lubricant expelled from the gearbox during operation. Gutters are often designed to circumscribe the ring gear, without taking into account the requirements of the engine or the gearbox. This results in gutters that are too large or too small. A gutter that is larger than required for the engine takes up valuable space in the engine, adding weight to the engine and decreasing overall engine efficiency. A gutter that is smaller than required for the engine may not properly scavenge the lubricant from the gearbox, allowing leakage from the gutter and reducing the ability of the lubricant to remove heat from the gearbox. The inventors, seeking ways to improve upon existing gutters in terms of their size/capacity for particular architectures, gearbox types, or mission requirements, tested different gutter configurations to ascertain what factors play into an appropriate gutter sizing.

FIG. 1 illustrates a schematic, cross-sectional view of an engine, also referred to as a gas turbine engine 10. The gas turbine engine 10 defines an axial direction A extending parallel to a longitudinal, engine centerline, also referred to as a longitudinal centerline axis 12, a radial direction R that is normal to the axial direction A, and a circumferential direction C about the longitudinal centerline axis 12 (shown in/out of the page in FIG. 1). The gas turbine engine 10 includes a fan section 14 and a core engine, also referred to as a turbo-engine 16, downstream from the fan section 14.

The turbo-engine 16 includes a core engine casing 18 that is substantially tubular and defines an annular inlet 20. The core engine casing 18 encases, and the turbo-engine 16 includes, in serial flow relationship, a compressor section 22 including a low-pressure (LP) compressor 24, also referred to as a booster 24, followed downstream by a high-pressure (HP) compressor 26, a combustion section 28, a turbine section 30 including a high-pressure (HP) turbine 32 followed downstream by a low-pressure (LP) turbine 34, and a jet exhaust nozzle section 72 downstream of the low-pressure turbine 34. A high-pressure (HP) shaft 36 drivingly connects the high-pressure turbine 32 to the high-pressure compressor 26 to rotate the high-pressure turbine 32 and the high-pressure compressor 26 in unison. The compressor section 22, the combustion section 28, and the turbine section 30 together define a core air flowpath 38 extending from the annular inlet 20 to the jet exhaust nozzle section 72.

A low-pressure (LP) shaft 40 drivingly connects the low-pressure turbine 34 to the booster 24 to rotate the low-pressure turbine 34 and the booster 24 in unison. The HP shaft 36 or the LP shaft 40 are referred to herein as a turbo-engine shaft. A gearbox assembly 100 couples the low-pressure shaft 40 to a fan shaft 42 to drive the fan blades 44 of the fan section 14. The fan shaft 42 is coupled to a fan frame 74. The gas turbine engine 10 includes one or more engine bearings 76 that support rotation of the shafts of the gas turbine engine 10. The engine bearings 76 include one or more LP shaft bearings **76*a* that support rotation of the LP shaft 40, one or more HP shaft bearings 76*b* that support rotation of the HP shaft 36, and one or more fan shaft bearings 76*c* that support rotation of the fan shaft 42**.

The fan blades 44 extend radially outward from the longitudinal centerline axis 12 in the direction R. The fan blades 44 rotate about the longitudinal centerline axis 12 via the fan shaft 42 that is powered by the low-pressure shaft 40 across the gearbox assembly 100. The gearbox assembly 100 adjusts the rotational speed of the fan shaft 42 and, thus, the fan blades 44 relative to the low-pressure shaft 40. That is, the gearbox assembly 100 is a reduction gearbox and power gearbox that delivers a torque from the low-pressure shaft 40 running at a first speed, to the fan shaft 42 coupled to fan blades 44 running at a second, slower speed.

In FIG. 1, the fan section 14 includes an annular fan casing or a nacelle 46 that circumferentially surrounds the fan blades 44 or at least a portion of the turbo-engine 16. The nacelle 46 is supported relative to the turbo-engine 16 by a plurality of circumferentially spaced outlet guide vanes 48. Moreover, an aft section 50 of the nacelle 46 extends circumferentially around a portion of the core engine casing 18 of the turbo-engine 16 to define a bypass airflow passage 52 therebetween.

During operation of the gas turbine engine 10, a volume of air, represented by airflow 54, enters the gas turbine engine 10 through an inlet 56 of the nacelle 46 or the fan section 14. As airflow 54 passes across the fan blades 44, a first portion of the airflow 54, represented by bypass airflow 58, is directed or is routed into the bypass airflow passage 52, and a second portion of the airflow 54, represented by core airflow 60, is directed or is routed into an upstream section of the core air flowpath 38 via the annular inlet 20. The ratio between the bypass airflow 58 and the core airflow 60 defines a bypass ratio. The pressure of the core airflow 60 is increased as the core airflow 60 is routed through the high-pressure compressor 26 and into the combustion section 28, where the now highly pressurized core airflow 60 is mixed with fuel and burned to provide combustion products or combustion gases, represented by flow 62.

The combustion gases, via flow 62, are routed into the high-pressure turbine 32 and expanded through the high-pressure turbine 32 where a portion of thermal or of kinetic energy from the combustion gases is extracted via sequential stages of high-pressure turbine stator vanes that are coupled to the core engine casing 18 and high-pressure turbine rotor blades 64 that are coupled to the high-pressure shaft 36, thus, causing the high-pressure shaft 36 to rotate, thereby supporting operation of the high-pressure compressor 26. The combustion gases, via flow 62, are then routed into the low-pressure turbine 34 and expanded through the low-pressure turbine 34. Here, a second portion of thermal and kinetic energy is extracted from the combustion gases via sequential stages of the low-pressure turbine stator vanes that are coupled to the core engine casing 18 and low-pressure turbine rotor blades 66 that are coupled to the low-pressure shaft 40, thus, causing the low-pressure shaft 40 to rotate. This thereby supports operation of the booster 24 and rotation of the fan blades 44 via the gearbox assembly 100.

The combustion gases, via flow 62, are subsequently routed through the jet exhaust nozzle section 72 downstream of the low-pressure turbine 34 to provide propulsive thrust. The high-pressure turbine 32, the low-pressure turbine 34, and the jet exhaust nozzle section 72 at least partially define a hot gas path 70 for routing the combustion gases, via flow 62, through the turbo-engine 16. Simultaneously, the pressure of the bypass airflow 58 is increased as the bypass airflow 58 is routed through the bypass airflow passage 52 before being exhausted from a fan nozzle exhaust section 68 of the gas turbine engine 10, also providing propulsive thrust.

The gas turbine engine 10 depicted in FIG. 1 is by way of example only. In other exemplary embodiments, the gas turbine engine 10 may have any other suitable configuration. For example, in other exemplary embodiments, the fan section 14 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, or turboshaft engines.

Figure 2:
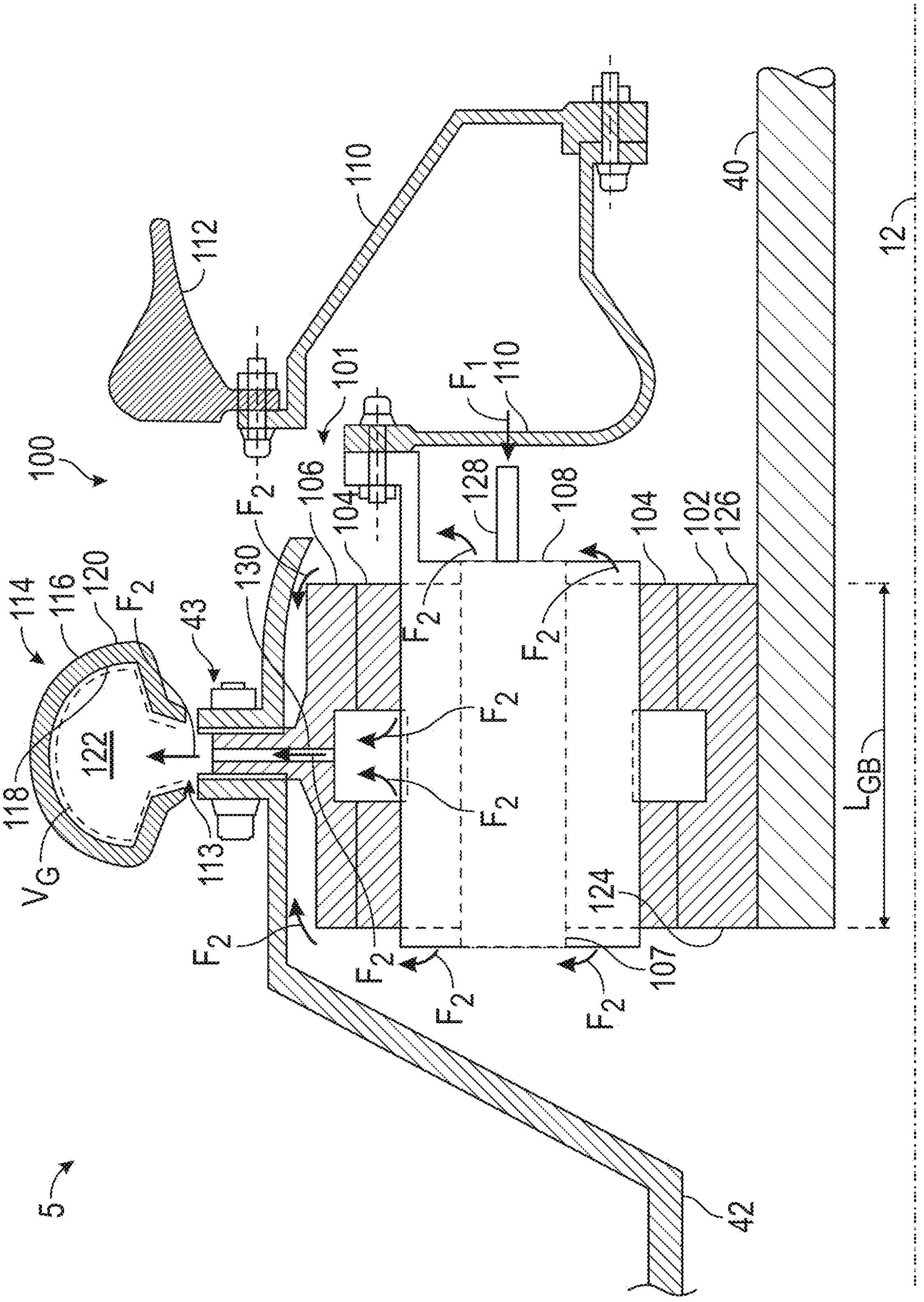
FIG. 2 illustrates a schematic, detail view of the gearbox assembly of the engine of FIG. 1, according to an embodiment of the present disclosure.
Figure 3:
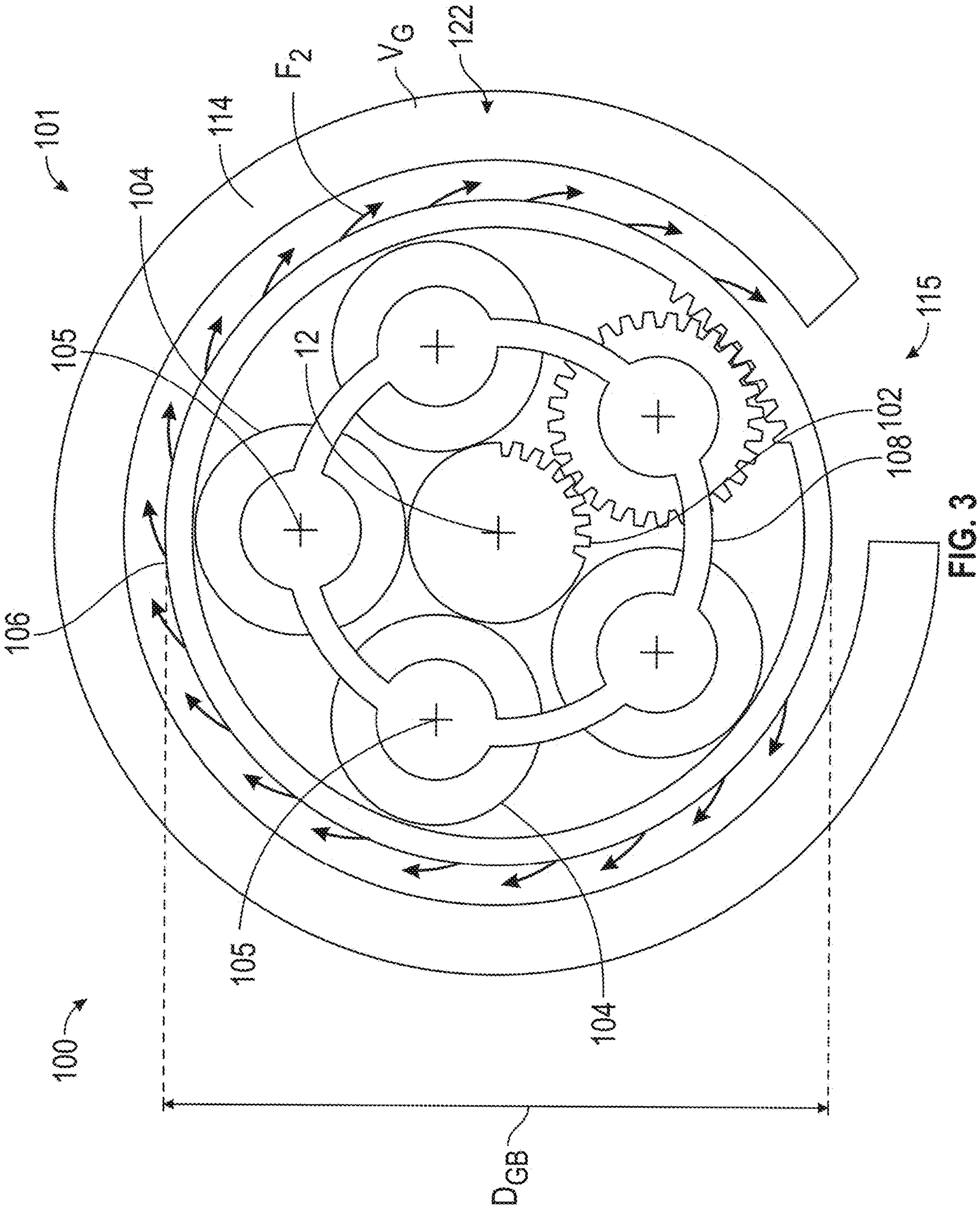
FIG. 3 illustrates a schematic, axial end view of the gearbox assembly of FIG. 2, taken along line 3-3 of FIG. 1, with the fan shaft omitted for clarity, according to an embodiment of the present disclosure.

FIG. 2 illustrates a detail view 5 of FIG. 1 of the gearbox assembly 100. FIG. 3 illustrates a schematic axial end view, taken along the line 3-3 of FIG. 1, of the gears of the gearbox assembly 100. The fan shaft 42 and a coupling 43 are omitted from FIG. 3 for clarity. Referring to FIGS. 2 and 3, the gearbox assembly 100 includes a gearbox 101 and a gutter 114. The gearbox 101 includes a plurality of gears including a sun gear 102, a plurality of planet gears 104, and a ring gear 106. The low-pressure turbine 34 (FIG. 1) drives the low-pressure shaft 40, which is coupled to the sun gear 102 of the gearbox assembly 100. The gearbox assembly 100 in turn drives the fan shaft 42.

Referring to FIG. 2, the low-pressure shaft 40 causes the sun gear 102 to rotate about the longitudinal centerline axis 12. Radially outwardly of the sun gear 102, and intermeshing therewith, is the plurality of planet gears 104 that are coupled together by a planet carrier 108. The planet carrier 108 is coupled, via a flex mount 110, to an engine frame 112. The planet carrier 108 constrains the plurality of planet gears 104 while allowing each planet gear of the plurality of planet gears 104 to rotate about a respective planet gear axis 105 (FIG. 3) on a pin 107. Radially outwardly of the plurality of planet gears 104, and intermeshing therewith, is the ring gear 106, which is an annular ring gear. The ring gear 106 is coupled to the fan shaft 42 at a coupling 43. The ring gear 106 is coupled via the fan shaft 42 to the fan blades 44 (FIG. 1) in order to drive rotation of the fan blades 44 about the longitudinal centerline axis 12. The gutter 114 includes a gutter wall 116 having an inner surface 118 and an outer surface 120. A gutter volume $V_G$ is defined within an interior 122 of the gutter wall 116. The gutter volume $V_G$ is illustrated by the dashed line in FIG. 2 for illustration purposes, the volume $V_G$ extends all the way to the inner surface 118 of the gutter 114. Although the gutter 114 is depicted with a relatively bell-like shape or tear-drop shape, any shape suitable to collecting lubricant is contemplated.

Although not depicted in FIG. 2, and shown only partially in FIG. 3 for clarity, each of the sun gear 102, the plurality of planet gears 104, and the ring gear 106 comprises teeth about their periphery to intermesh with teeth of the adjacent gears. The gearbox 101 has a gearbox diameter $D_{GB}$ defined by an outer diameter of the gearbox 101. The outer diameter of the gearbox 101 may be the outer diameter of the ring gear 106 such that the gearbox diameter $D_{GB}$ is defined by the outer diameter of the ring gear 106. Referring to FIG. 2, the sun gear 102, the plurality of planet gears 104, and the ring gear 106 are axially aligned such that a forwardmost end 124 of the gears is coplanar and an aftmost end 126 of the gears is coplanar. The gearbox 101 has an axial gearbox length $L_{GB}$ defined from the forwardmost end 124 of the gears to the aftmost end 126 of the gears.

Referring to FIG. 3, the gutter 114 may be circular and may wholly or partially circumscribe the gears of the gearbox assembly 100. For example, the gutter 114 may wholly or partially circumscribe the ring gear 106. Therefore, the gutter 114 is located radially outward of the sun gear 102, the plurality of planet gears 104, and the ring gear 106. The gutter 114 does not rotate with the gears of the gearbox assembly 100.

The gutter 114 includes a scavenge port 115 located at or near the bottom of the gutter 114. The scavenge port 115 allows lubricant collected by the gutter 114 to be removed from the gearbox assembly 100. Although shown as a large opening in the gutter 114, the scavenge port 115 may be any size or shape aperture or port that allows a flow of fluid from the interior 122 of the gutter 114 to a passage or reservoir (not depicted) outside of the gearbox assembly 100. By locating the scavenge port 115 at or near the bottom portion of the gutter 114, gravity may assist in causing the lubricant to flow toward the scavenge port 115 and, thus, may promote removal of the lubricant from the gearbox assembly 100. Once removed from the gutter 114, the lubricant may be recirculated through a lubricant channel 128 (FIG. 2) or collected elsewhere for disposal or removal.

The gearbox assembly 100 of FIGS. 2 and 3 is a star configuration gearbox assembly, in that the planet carrier 108 is held fixed (e.g., via the flex mount 110 to the engine frame 112) and the ring gear 106 is permitted to rotate. That is, the fan section 14 is driven by the ring gear 106. However, other suitable types of gearbox assembly 100 may be employed. In one non-limiting example, the gearbox assembly 100 may be a planetary configuration, in that the planet carrier 108 is coupled to the fan shaft 42 (FIG. 1) via an output shaft to rotate the fan shaft 42, with the ring gear 106 being held stationary or fixed. In this example, the fan section 14 (FIG. 1) is driven by the planet carrier 108. In another non-limiting example, the gearbox assembly 100 may be a differential gearbox in which the ring gear 106 and the planet carrier 108 are both allowed to rotate.

During engine operation, and referring to FIGS. 2 and 3, gears of the gearbox assembly 100 rotate as previously described. A lubricant (e.g., oil) is provided to lubricate the rotating parts of the gearbox assembly 100, including the sun gear 102, the plurality of planet gears 104, the ring gear 106, and the pins 107. A lubricant system (e.g., the lubricant system shown in FIGS. 4 and 5) supplies a flow $F_1$, also referred to as a first lubricant flow $F_1$, of the lubricant through the lubricant channel 128 to supply lubricant to the gearbox assembly 100. As the gears of the gearbox assembly 100 rotate, centrifugal forces expel the lubricant radially outward, away from the longitudinal centerline axis 12, as shown by flow $F_2$, also referred to as a second lubricant flow $F_2$, or a gearbox scavenge flow $F_2$. The flow $F_2$ flows around the ring gear 106 or through a ring gear passage 130 to be collected by the gutter 114. The lubricant flows into a gutter inlet 113. In this manner, lubricant supplied through the lubricant channel 128 is collected in the gutter 114 after flowing through and around the gears and other rotating parts of the gearbox assembly 100.

Figure 4:
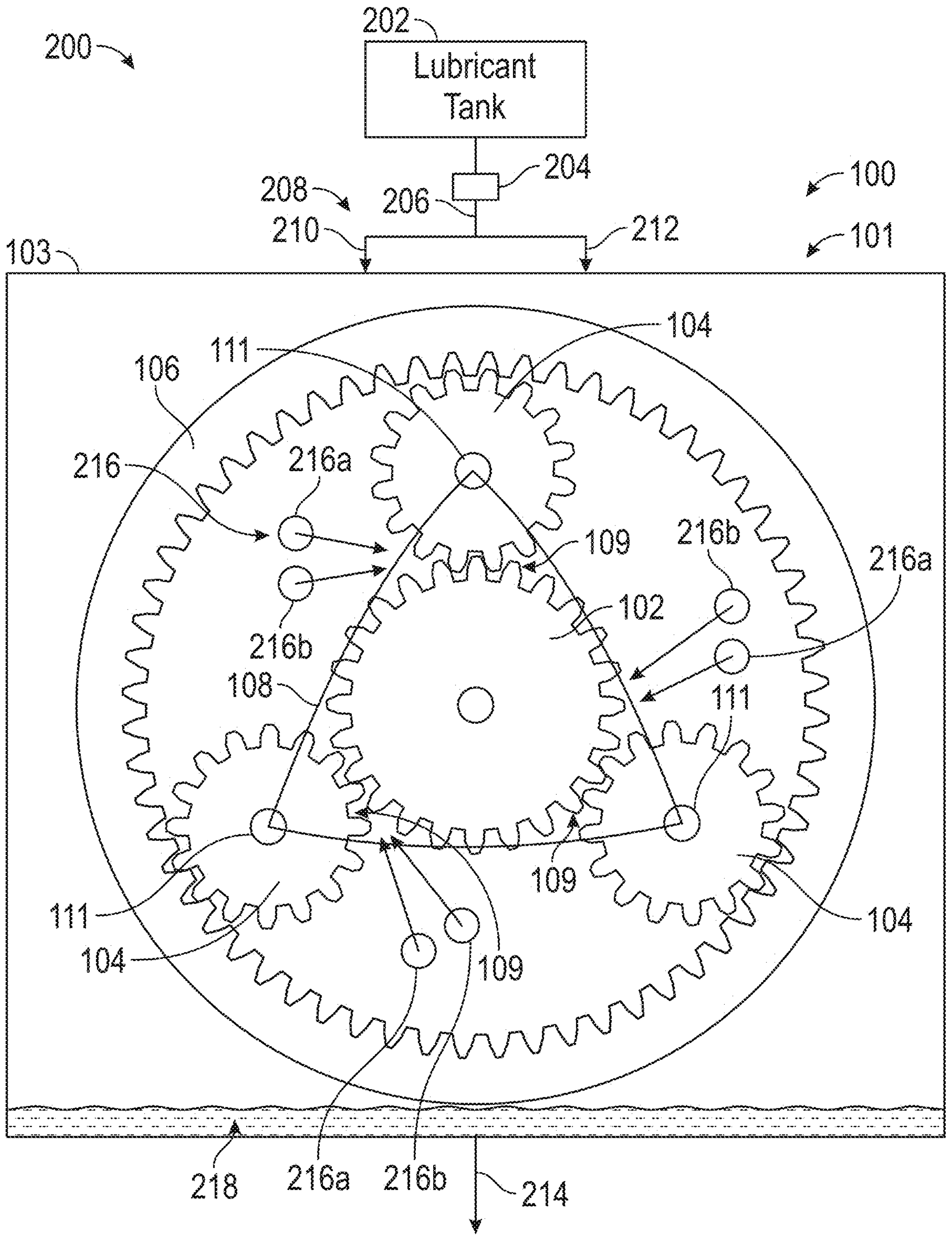
FIG. 4 is a schematic, axial end, cross-sectional view of a gearbox assembly and a portion of a lubrication system for the gas turbine engine of FIG. 1, according to the present disclosure.

FIG. 4 is a schematic axial end view of the gearbox assembly 100 and a portion of a lubrication system 200, according to the present disclosure. As shown in FIG. 4, the gears intermesh with each other at a mesh 109. At least one of the gears includes one or more bearings 111 disposed within the at least one of the gears such that the at least one of the gears rotates with respect to the one or more bearings 111. In this embodiment, the one or more bearings 111 are roller bearings. The gearbox assembly 100 includes a housing 103 that encloses at least a portion of the gearbox 101.

The lubrication system 200 includes a lubricant tank 202, a lubricant pump 204, and one or more lubricant supply lines 206. The lubricant tank 202 includes a tank, a reservoir, or a sump for storing lubricant (e.g., oil) therein and supplies the lubricant to the gas turbine engine 10 (FIG. 1) or the gearbox assembly 100 through the one or more lubricant supply lines 206. The lubricant pump 204 is in fluid communication with the lubricant tank 202 and the one or more lubricant supply lines 206.

The lubrication system 200 includes a gearbox lubrication system 208. The gearbox lubrication system 208 supplies the lubricant to the gearbox assembly 100 for lubricating the gears. In particular, the gearbox lubrication system 208 supplies the lubricant to at least one of the mesh 109 or the bearings 111 of the gears. The gearbox lubrication system 208 includes one or more primary gearbox lubricant supply lines 210 and one or more secondary gearbox lubricant supply lines 212.

The primary gearbox lubricant supply lines 210 are in fluid communication with the one or more lubricant supply lines 206 and the gearbox assembly 100 for supplying the lubricant to the gearbox assembly 100 from the lubricant tank 202. In some embodiments, the primary gearbox lubricant supply lines 210 are fluidly coupled to the lubricant supply lines 206. In some embodiments, the primary gearbox lubricant supply lines 210 embody a portion of the lubricant supply lines 206 (e.g., as branches of the lubricant supply lines 206).

The one or more secondary gearbox lubricant supply lines 212 are in fluid communication with lubricant supply lines 206 and the gearbox assembly 100 for supplying the lubricant to the gearbox assembly 100 from the lubricant tank 202. In some embodiments, the secondary gearbox lubricant supply lines 212 are fluidly coupled to the lubricant supply lines 206. In some embodiments, the secondary gearbox lubricant supply lines 212 embody a portion of the lubricant supply lines 206 (e.g., as branches of the lubricant supply lines 206).

The gearbox lubrication system 208 also includes one or more gearbox lubricant return lines 214, one or more gearbox lubricant injectors 216, and a sump 218. The gearbox lubricant return lines 214 are in fluid communication with the gearbox assembly 100 and the lubricant tank 202 for returning the lubricant that drains from the gears (e.g., the mesh 109 or the bearings 111) to the lubricant tank 202.

The gearbox lubricant injectors 216 are in fluid communication with the primary gearbox lubricant supply lines 210 and the secondary gearbox lubricant supply lines 212 to inject the lubricant to the gears. In particular, the gearbox lubricant injectors 216 are positioned to inject the lubricant to at least one of the mesh 109 or the bearings 111. For example, one or more of the gearbox lubricant injectors 216 can be positioned to inject the lubricant to the mesh 109 and one or more of the gearbox lubricant injectors 216 can be positioned to inject the lubricant to the bearings 111.

The gearbox lubricant injectors 216 include one or more primary gearbox lubricant injectors 216*a* in fluid communication with the primary gearbox lubricant supply lines 210 and one or more secondary gearbox lubricant injectors 216*b* in fluid communication with the secondary gearbox lubricant supply lines 212. In some embodiments, the primary gearbox lubricant injectors 216*a* and the secondary gearbox lubricant injectors 216*b* are sized the same (e.g., same diameter). In some embodiments, the primary gearbox lubricant injectors 216*a* and the secondary gearbox lubricant injectors 216*b* are sized differently (e.g., different diameters).

The sump 218 is a reservoir within the housing 103 that collects the lubricant that drains from the gears or from the bearings 111. The sump 218 is in fluid communication with the gearbox lubricant return lines 214 for draining the lubricant from the sump 218. In this way, the gearbox lubrication system 208 includes the sump 218.

In operation, the lubricant pump 204 pumps the lubricant from the lubricant tank 202 to the one or more rotating components of the gas turbine engine 10 (FIG. 1) or to the gearbox assembly 100 through the one or more lubricant supply lines 206 for lubricating the one or more rotating components or the gears. In particular, the one or more primary gearbox lubricant supply lines 210 and the one or more secondary gearbox lubricant supply lines 212 direct the lubricant to the gearbox 101 to lubricate the gears (e.g., to the mesh 109 or to the bearings 111). In particular, the primary gearbox lubricant injectors 216*a* and the secondary gearbox lubricant injectors 216*b* inject the lubricant to the gears. The lubrication system 200 supplies the lubricant to the gas turbine engine 10 or to the gearbox assembly 100 at a mass flow rate. In the embodiment of FIG. 4, the lubrication system 200 modulates the mass flow rate to the gearbox assembly 100 based on operating conditions of the gas turbine engine 10, as detailed further below.

The lubricant drains from the gearbox 101 into the sump 218. The gearbox lubricant return lines 214 directs the lubricant from the sump 218 back to the lubricant tank 202. For example, the lubricant pump 204 (or a separate pump) pumps the lubricant through the gearbox lubricant return lines 214 and re-circulates the lubricant to the lubricant tank 202. In this way, the lubricant can be re-used to lubricate the gears (e.g., the mesh 109), the bearings 111, other components of the gearbox assembly 100, or the rotating components of the gas turbine engine 10.

Figure 5:
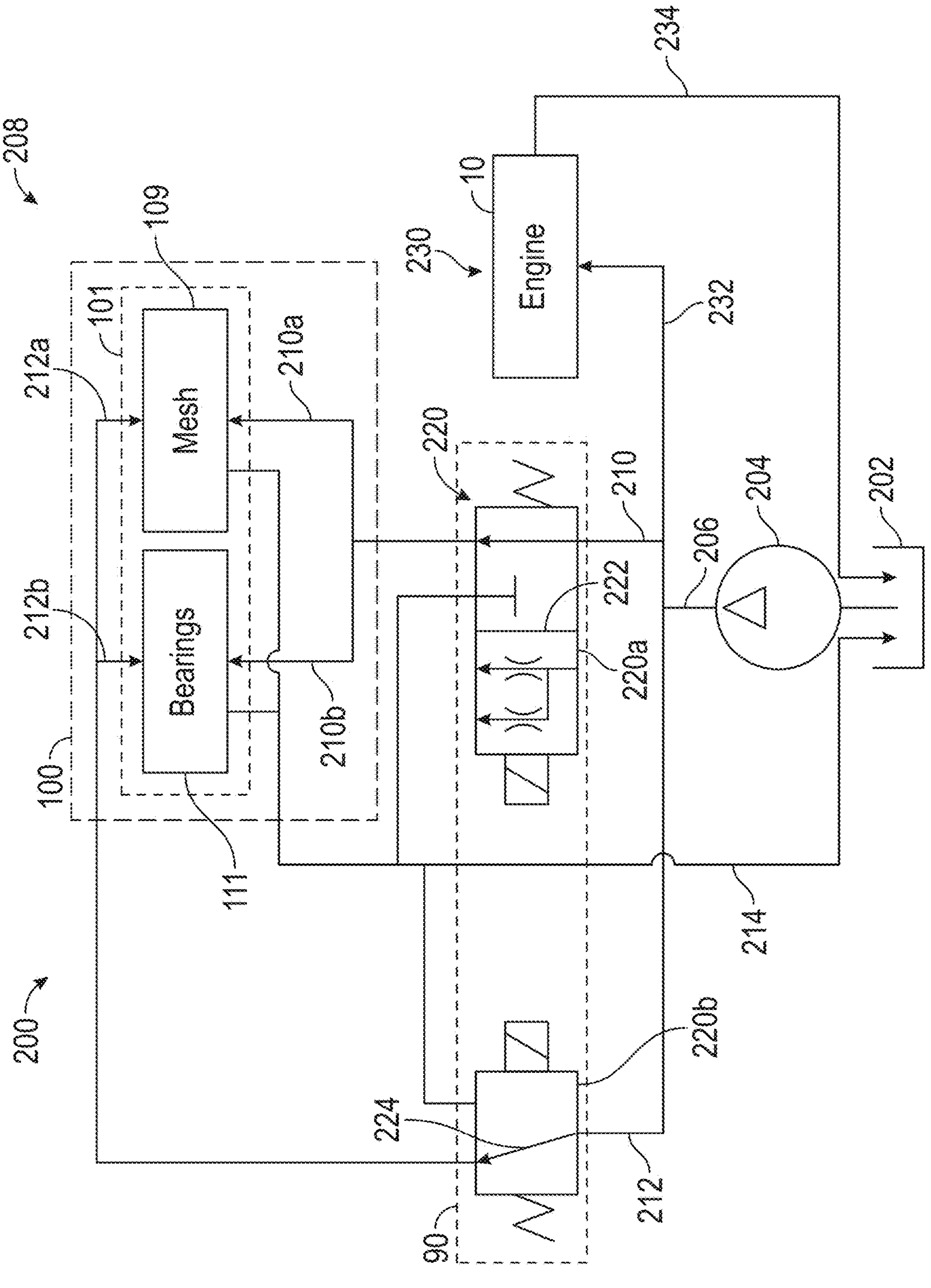
FIG. 5 is a schematic diagram of the lubrication system of FIG. 4, according to an embodiment of the present disclosure.

FIG. 5 is a schematic diagram of the lubrication system 200 for the gas turbine engine 10, according to the present disclosure. As shown in FIG. 5, the gas turbine engine 10 includes a controller 90 for controlling aspects of the gas turbine engine 10. For example, the controller 90 is in two-way communication with the gas turbine engine 10 for receiving signals from various sensors and control systems of the gas turbine engine 10 and for controlling components of the gas turbine engine 10, as detailed further below. The controller 90, or components thereof, may be located onboard the gas turbine engine 10, onboard the aircraft, or can be located remote from each of the gas turbine engine 10 and the aircraft. The controller 90 can be a Full Authority Digital Engine Control (FADEC) that controls aspects of the gas turbine engine 10.

The controller 90 may be a standalone controller or may be part of an engine controller to operate various systems of the gas turbine engine 10. In this embodiment, the controller 90 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 90 to perform operations. The controller 90 and, more specifically, the one or more processors are programmed or configured to perform these operations, such as the operations discussed further below. In some embodiments, the instructions can be executed by the one or more processors to cause the one or more processors to complete any of the operations and functions for which the controller 90 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The one or more primary gearbox lubricant supply lines 210 include a first primary gearbox lubricant supply line 210*a* and a second primary gearbox lubricant supply line 210*b*. The first primary gearbox lubricant supply line 210*a* is in fluid communication with the mesh 109 for supplying the lubricant to the mesh 109. The second primary gearbox lubricant supply line 210*b* is in fluid communication with the bearings 111 for supplying the lubricant to the bearings 111.

The one or more secondary gearbox lubricant supply lines 212 include a first secondary gearbox lubricant supply line 212*a* and a second secondary gearbox lubricant supply lines 212*b*. The first secondary gearbox lubricant supply line 212*a* is in fluid communication with the mesh 109 for supplying the lubricant to the mesh 109. The second secondary gearbox lubricant supply line 212_b_ is in fluid communication with the bearings 111 for supplying the lubricant to the bearings 111.

The gearbox lubrication system 208 includes one or more valves 220 disposed in the one or more lubricant supply lines 206 for modulating a flow of the lubricant to the gearbox assembly 100. In particular, the one or more valves 220 include a primary valve 220_a_ and an secondary valve 220_b_. The primary valve 220_a_ is in fluid communication with the primary gearbox lubricant supply lines 210. The secondary valve 220_b_ is in fluid communication with the secondary gearbox lubricant supply lines 212. The valves 220 can include at least one of the primary valve 220_a_ or the secondary valve 220_b_. For example, the valves 220 can include only the primary valve 220_a_, only the secondary valve 220_b_, or both the primary valve 220_a_ and the secondary valve 220_b_.

The primary valve 220_a_ is a proportional modulating valve (PMV) that includes a primary valve member 222 that moves between a fully opened positioned and a fully closed position to modulate the flow of the lubricant through the primary gearbox lubricant supply lines 210. The primary valve 220_a_ is a control valve that is controlled by the controller 90. In particular, the primary valve 220_a_ is in communication with the controller 90 such that the controller 90 controls the primary valve 220_a_ to move the primary valve member 222 between the fully opened position and the fully closed position, as detailed further below. In some embodiments, the primary valve 220_a_ can be a passive valve that is controlled by, for example, the pressure of the lubricant, rather than by the controller 90. In the fully opened position, the primary valve 220_a_ allows the lubricant to fully flow through the primary gearbox lubricant supply lines 210. In the fully closed position, the primary valve 220_a_ prevents the lubricant from flowing through the primary gearbox lubricant supply lines 210. The primary valve 220_a_ can move the primary valve member 222 anywhere between the fully opened position and the fully closed position to modulate the flow of the lubricant through the primary gearbox lubricant supply lines 210.

The secondary valve 220_b_ is a shut-off valve (SOV) that includes an secondary valve member 224 that moves between an opened position and a closed position. The secondary valve 220_b_ is a control valve that is controlled by the controller 90. In particular, the secondary valve 220_b_ is in communication with the controller 90 such that the controller 90 controls the secondary valve 220_b_ to move the secondary valve member 224 between the opened position and the closed position. In some embodiments, the secondary valve 220_b_ can be a passive valve that is controlled by, for example, the pressure of the lubricant, rather than by the controller 90. In the opened position, the secondary valve 220_b_ allows the lubricant to fully flow through the secondary gearbox lubricant supply lines 212. In the closed position, the secondary valve 220_b_ prevents the lubricant from flowing through the secondary gearbox lubricant supply lines 212.

The lubrication system 200 also includes a gas turbine engine lubrication system 230. The gas turbine engine lubrication system 230 supplies the lubricant to one or more rotating components of the gas turbine engine 10. The one or more rotating components include at least one of the HP shaft 36 (FIG. 1), the LP shaft 40 (FIG. 1), or the one or more engine bearings 76, or one or more dampers. The gas turbine engine lubrication system 230 includes one or more engine lubricant supply lines 232 in fluid communication with the one or more lubricant supply lines 206 and the one or more rotating components of the gas turbine engine 10 for supplying the lubricant to the one or more rotating components from the lubricant tank 202. In some embodiments, the one or more engine lubricant supply lines 232 are fluidly coupled to the one or more lubricant supply lines 206. In some embodiments, the one or more engine lubricant supply lines 232 embody a portion of the one or more lubricant supply lines 206 (e.g., as branches of the one or more lubricant supply lines 206). The gas turbine engine lubrication system 230 can also include one or more engine lubricant return lines 234 for returning the lubricant to the lubricant tank 202 after draining from the rotating components.

In operation, the lubrication system 200 modulates the flow of the lubricant to the gearbox assembly 100. In particular, the controller 90 controls the primary valve 220_a_ based on at least one of a gearbox inlet pressure (e.g., a pressure of the lubricant at an inlet of the gearbox assembly 100), a gas turbine engine delivery pressure (e.g., a pressure of the lubricant flowing through the gas turbine engine lubrication system 230), a gas turbine engine speed (e.g., a speed of the turbo-engine 16 (FIG. 1)), a gearbox lubricant temperature (e.g., a temperature of the lubricant in the gearbox assembly 100, for example, in the sump 218 of the gearbox assembly 100), or an input torque or an output torque of the gearbox assembly 100. The controller 90 can also control the primary valve 220_a_ based on at least one of turbine engine power (e.g., a power output from the turbo-engine 16), a turbine engine pressure (e.g., a pressure in the compressor section 22 (FIG. 1)), or a turbine engine temperature (e.g., a temperature in the compressor section 22).

The controller 90 controls the secondary valve 220_b_ based on at least one of turbine engine power (e.g., a power output from the turbo-engine 16), a gas turbine engine speed (e.g., a speed of the turbo-engine 16), a turbine engine pressure (e.g., a pressure in the compressor section), or a turbine engine temperature (e.g., a temperature in the compressor section). The controller 90 can also control the secondary valve 220_b_ based on at least one of the gearbox inlet pressure, the turbine engine delivery pressure, the turbine engine speed, the gearbox lubricant temperature, or the input torque or the output torque of the gearbox assembly 100.

During the high-power operation (e.g., the gas turbine engine speed or the gas turbine engine power is greater than a threshold), the primary valve 220_a_ is in the fully opened position and the secondary valve 220_b_ is in the opened position. In this way, the lubricant flows at a first mass flow rate ($\dot{m}_1$) through the primary gearbox lubricant supply lines 210 to the gearbox assembly 100 (e.g., through the first primary gearbox lubricant supply line 210_a_ to the mesh 109 and through the second primary gearbox lubricant supply line 210_b_ to the bearings 111). The first mass flow rate is at a maximum first mass flow rate ($\dot{m}_1$) when the primary valve 220_a_ is in the fully opened position. Similarly, the lubricant flows at a second mass flow rate ($\dot{m}_2$) through the secondary gearbox lubricant supply lines 212 (through the first secondary gearbox lubricant supply line 212_a_ to the mesh 109 and through the second secondary gearbox lubricant supply line 212_b_ to the bearings 111). The second mass flow rate ($\dot{m}_2$) is at a maximum when the secondary valve 220_b_ is in the opened position. In this way, the lubricant flows at a total mass flow rate ($\dot{m}_{total}$) to the gearbox assembly 100 that is a sum of the first mass flow ($\dot{m}_1$) and the second mass flow rate ($\dot{m}_2$). The total mass flow rate ($\dot{m}_{total}$) is at a maximum total mass flow rate when the primary valve 220_a_ is in the fully opened position and the secondary valve 220_b_ is in the opened position.

During the low-power operation or the mid-power operation (e.g., the gas turbine engine speed or the gas turbine engine power is less than a threshold), the primary valve 220*a* is in a partially opened position (e.g., between the fully opened position and the fully closed position) and the secondary valve 220*b* is in the closed position. In this way, the first mass flow rate ($\dot{m}_1$) of the lubricant through the primary gearbox lubricant supply lines 210 to the gearbox assembly 100 is less than the maximum first mass flow rate (and greater than zero) in the partially opened position. The second mass flow rate ($\dot{m}_2$) of the lubricant through the secondary gearbox lubricant supply lines 212 is zero in the closed position. In this way, the total mass flow rate ($\dot{m}_{total}$) of the lubricant to the gearbox assembly 100 is less than the maximum total mass flow rate. The primary valve 220*a* directs a portion of the lubricant to the lubricant tank 202 and directs a portion of the lubricant to the gearbox assembly 100 through the primary gearbox lubricant supply lines 210 when the primary valve 220*a* is in the partially opened position. The secondary valve 220*b* directs the lubricant to the lubricant tank 202 (through the gearbox lubricant return lines 214) and prevents the lubricant from flowing to the gearbox assembly 100 through the secondary gearbox lubricant supply lines 212 when the secondary valve 220*b* is in the closed position. In this way, the total mass flow rate ($\dot{m}_{total}$) of the lubricant to the gearbox assembly 100 is equal to the first mass flow rate ($\dot{m}_1$) when the secondary valve 220*b* is in the closed position. The controller 90 can control the primary valve 220*a* to modulate the flow of the lubricant through the primary gearbox lubricant supply lines 210 by moving the primary valve member 222 between the fully opened position and the fully closed position during the low-power conditions. In some embodiments, the primary valve 220*a* or the secondary valve 220*b* can be excluded. For example, the lubrication system 200 can include only the primary valve 220*a*, and not the secondary valve 220*b*, such that the lubrication system 200 modulates the flow of the lubricant with only the primary valve 220*a*. In some embodiments, the lubrication system 200 can include only the secondary valve 220*b*, and not the primary valve 220*a*, such that the lubrication system 200 modulates the flow of the lubricant with only the secondary valve 220*b*. In some embodiments, the lubrication system 200 modulates the mass flow rate only to the mesh 109, such that the mass flow rate is not modulated to the bearings 111. In this way, the mass flow rate of the lubricant to the bearings 111 is linear with the speed of the lubricant pump 204.

The present disclosure provides for a method of operating the gas turbine engine 10 including operating the lubrication system 200. In particular, the method of operating the gas turbine engine 10 and the lubrication system 200 includes the operations discussed above.

Figure 6:
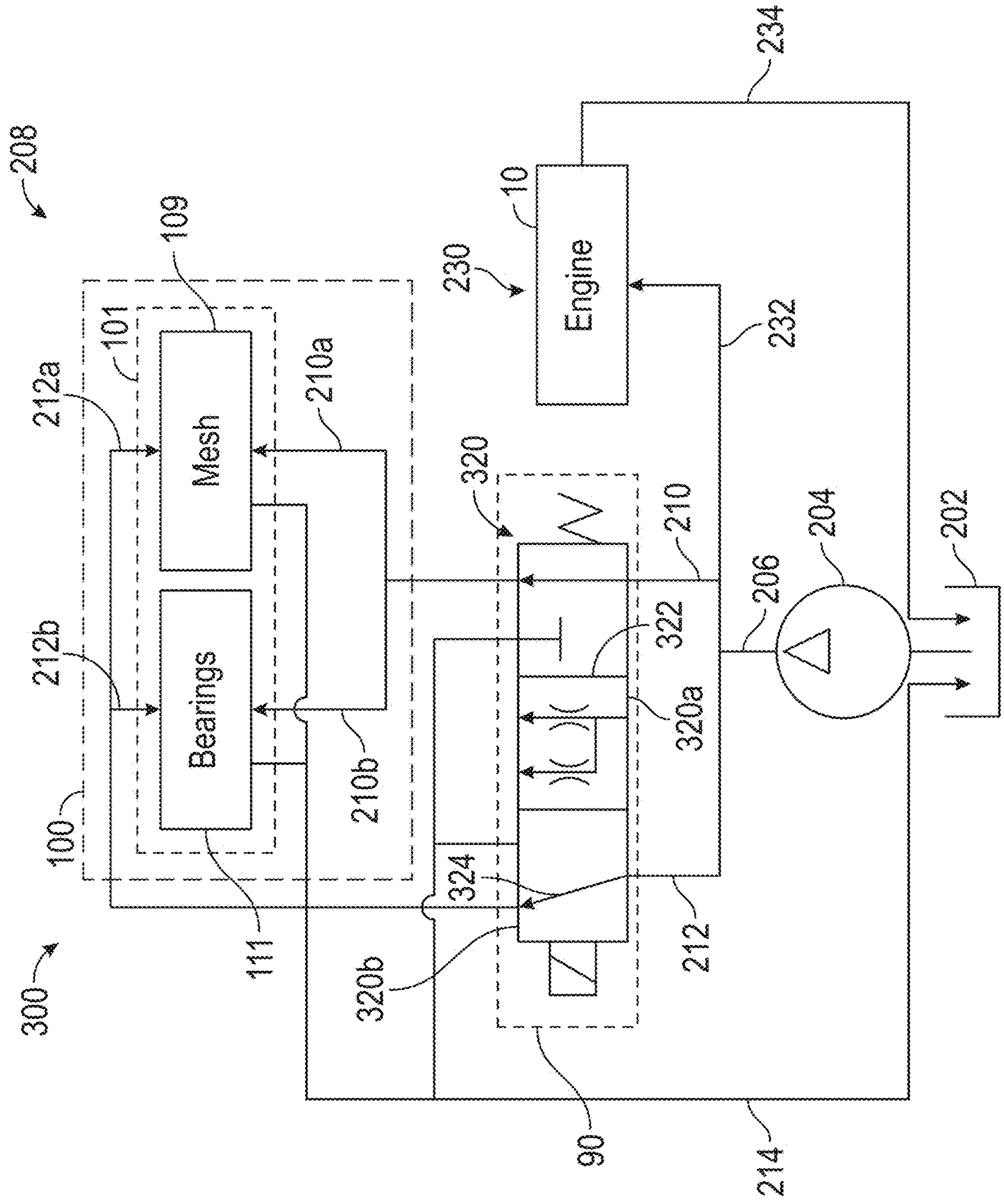
FIG. 6 is a schematic diagram of a lubrication system for the gas turbine engine of FIG. 1, according to an embodiment of the present disclosure.

FIG. 6 is a schematic diagram of a lubrication system 300 for the gas turbine engine 10 (FIG. 1), according to another embodiment. The lubrication system 300 is substantially similar to the lubrication system 200 of FIGS. 4 and 5. The same reference numerals or similar reference numerals will be used for components of the lubrication system 300 that are the same as or similar to the components of the lubrication system 200 discussed above. The description of these components above also applies to this embodiment, and a detailed description of these components is omitted here.

The lubrication system 300 includes one or more valves 320. The one or more valves 320 each includes a primary valve 320*a* and an secondary valve 320*b*. In this way, the primary valve 320*a* and the secondary valve 320*b* form a single, unitary valve in FIG. 6. The primary valve 320*a* includes a primary valve member 322. The secondary valve 320*b* includes an secondary valve member 324. The primary valve 320*a* and the secondary valve 320*b* operate similar to the primary valve 220*a* and the secondary valve 220*b* in FIG. 5, respectively, to modulate the mass flow rate of the lubricant to the gearbox assembly 100.

The present disclosure provides for a method of operating the gas turbine engine 10 including operating the lubrication system 300. In particular, the method of operating the gas turbine engine 10 and the lubrication system 300 includes the operations discussed above.

Figure 7:
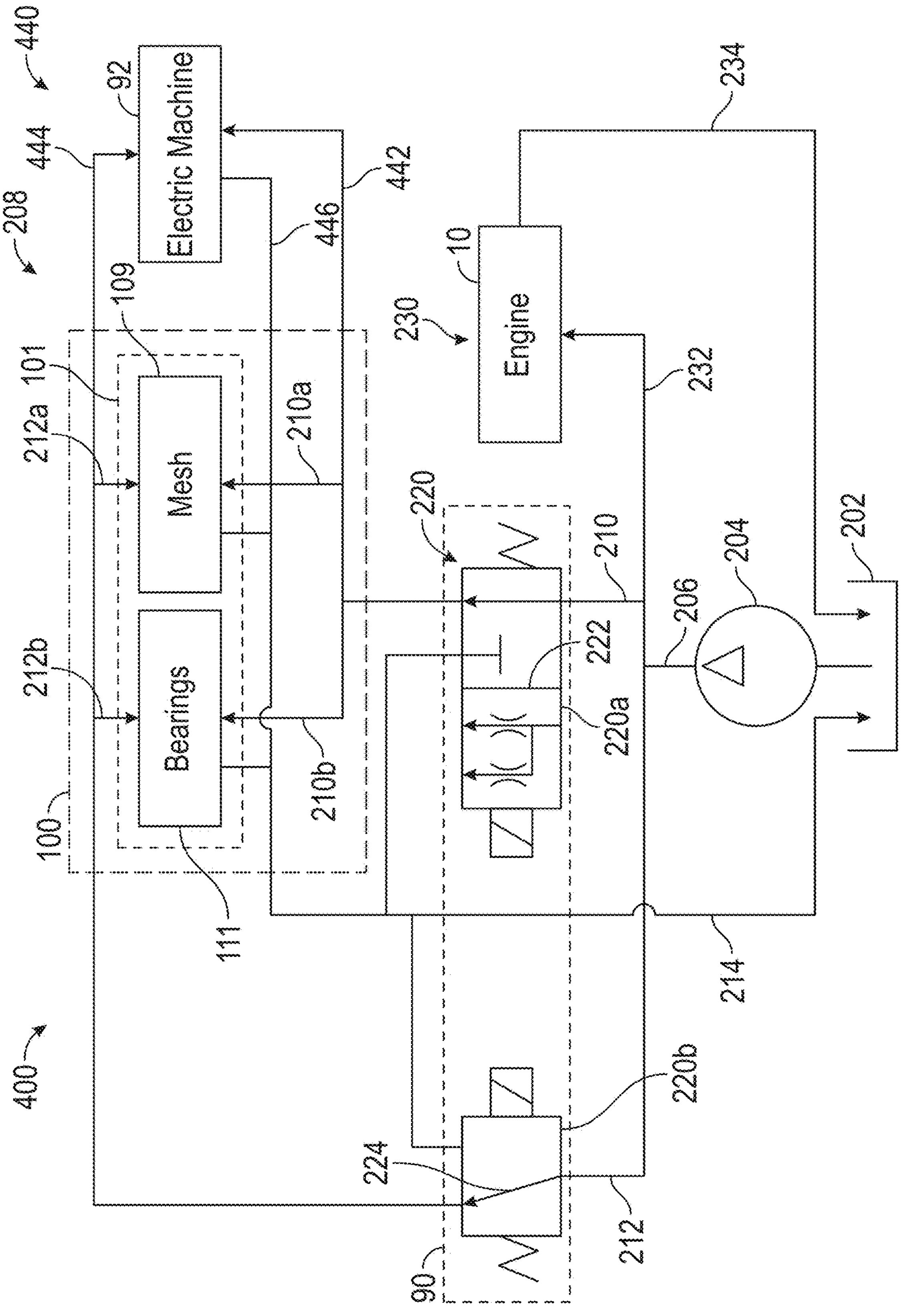
FIG. 7 is a schematic diagram of a lubrication system for the gas turbine engine of FIG. 1, according to an embodiment of the present disclosure.

FIG. 7 is a schematic diagram of a lubrication system 400 for the gas turbine engine 10, according to another embodiment. The lubrication system 400 is substantially similar to the lubrication system 200 of FIGS. 4 and 5. The same reference numerals or similar reference numerals will be used for components of the lubrication system 400 that are the same as or similar to the components of the lubrication system 200 discussed above. The description of these components above also applies to this embodiment, and a detailed description of these components is omitted here.

As shown in FIG. 7, the gas turbine engine 10 (FIG. 1) includes an electric machine 92. The electric machine 92 can be drivingly coupled to one of the shafts of the gas turbine engine 10, for example, the LP shaft 40 (FIG. 1) or the HP shaft 36 (FIG. 1). In this way, the gas turbine engine 10 is a hybrid electric turbine engine. The electric machine 92 can be used in many different power configurations.

In one form, the electric machine 92 can operate as a generator that is configured to extract mechanical power from the gas turbine engine 10 (e.g., from the LP shaft 40 or the HP shaft 36). The electric machine 92 converts the mechanical power to electric power. The extraction of mechanical power from the LP shaft 40 and conversion to electric power can be used to charge an on-board power storage device such as a battery, or alternatively, to provide electric power to another electrical device (e.g., an electric motor, an electrical accessory on an aircraft, etc.).

In other forms, the electric machine 92 can operate as a motor to provide power to the gas turbine engine 10 (e.g., to the LP shaft 40 or the HP shaft 36) to supplement power extracted by the LP turbine 34 from the combustion gases (the flow 62). In these forms, the electric machine 92 can be configured to provide a minimum of 10% of supplemental thrust to the gas turbine engine 10, a minimum of 20% of supplemental thrust to the gas turbine engine 10, and up to 40% of supplemental thrust to the gas turbine engine 10 in various embodiments. In still other forms, the electric machine 92 can be configured to drive 100% of thrust from the fan section 14. A scenario in which the electric machine 92 provides all power to the fan section 14 can include shutdown of the gas turbine engine 10. In one non-limiting example of the gas turbine engine 10 being shut down, upon, or near, landing, the controller 90 can command the turbo-engine 16 to shut down and command the electric machine 92 to drive further fan thrust requirements, such as, for example, power when the fan section 14 is configured in reverse pitch to aid in slowing the aircraft.

The lubrication system 400 includes an electric machine lubrication system 440 for supplying the lubricant to the electric machine 92 to lubricate or to cool one or more rotating components of the electric machine 92. The electric machine lubrication system 440 includes one or more primary electric machine lubricant supply lines 442 and one or more secondary electric machine lubricant supply lines 444 that are in fluid communication with the lubricant tank 202 and the electric machine 92. The electric machine 92 also includes one or more electric machine lubricant return lines 446 for returning the lubricant from the electric machine 92 to the lubricant tank 202.

The electric machine lubrication system 440 is in fluid communication with the gearbox lubrication system 208. In particular, the primary electric machine lubricant supply lines 442 are in fluid communication with the primary gearbox lubricant supply lines 210. The secondary electric machine lubricant supply lines 444 are in fluid communication with the secondary gearbox lubricant supply lines 212. The electric machine lubricant return lines 446 are in fluid communication with the gearbox lubricant return lines 214. In this way, the one or more valves 220 can modulate the mass flow rate of the lubricant to the electric machine 92, similar to the one or more valves 220 modulating the mass flow rate of the lubricant to the gearbox assembly 100. In some embodiments, the electric machine lubrication system 440 can be directly fluidly coupled with the lubricant tank 202 without being in fluid communication with the gearbox lubrication system 208. In such embodiments, the one or more valves 220 are disposed in at least one of the primary electric machine lubricant supply lines 442 or the secondary electric machine lubricant supply lines 444. In particular, the primary valve 220*a* can be disposed in the primary electric machine lubricant supply lines 442. The secondary valve 220*b* can be disposed in the secondary electric machine lubricant supply lines 444

In operation, the lubrication system 400 supplies the lubricant to the electric machine 92 at a mass flow rate. In the embodiment of FIG. 7, the lubrication system 400 modulates the mass flow rate to the electric machine 92 based on operating conditions of the gas turbine engine 10. In particular, the controller 90 controls the primary valve 220*a* and the secondary valve 220*b*, as detailed above with respect to FIG. 5, to modulate the mass flow rate of the lubricant to the electric machine 92.

The present disclosure provides for a method of operating the gas turbine engine 10 including operating the lubrication system 400. In particular, the method of operating the gas turbine engine 10 and the lubrication system 400 includes the operations discussed above.

Figure 8:
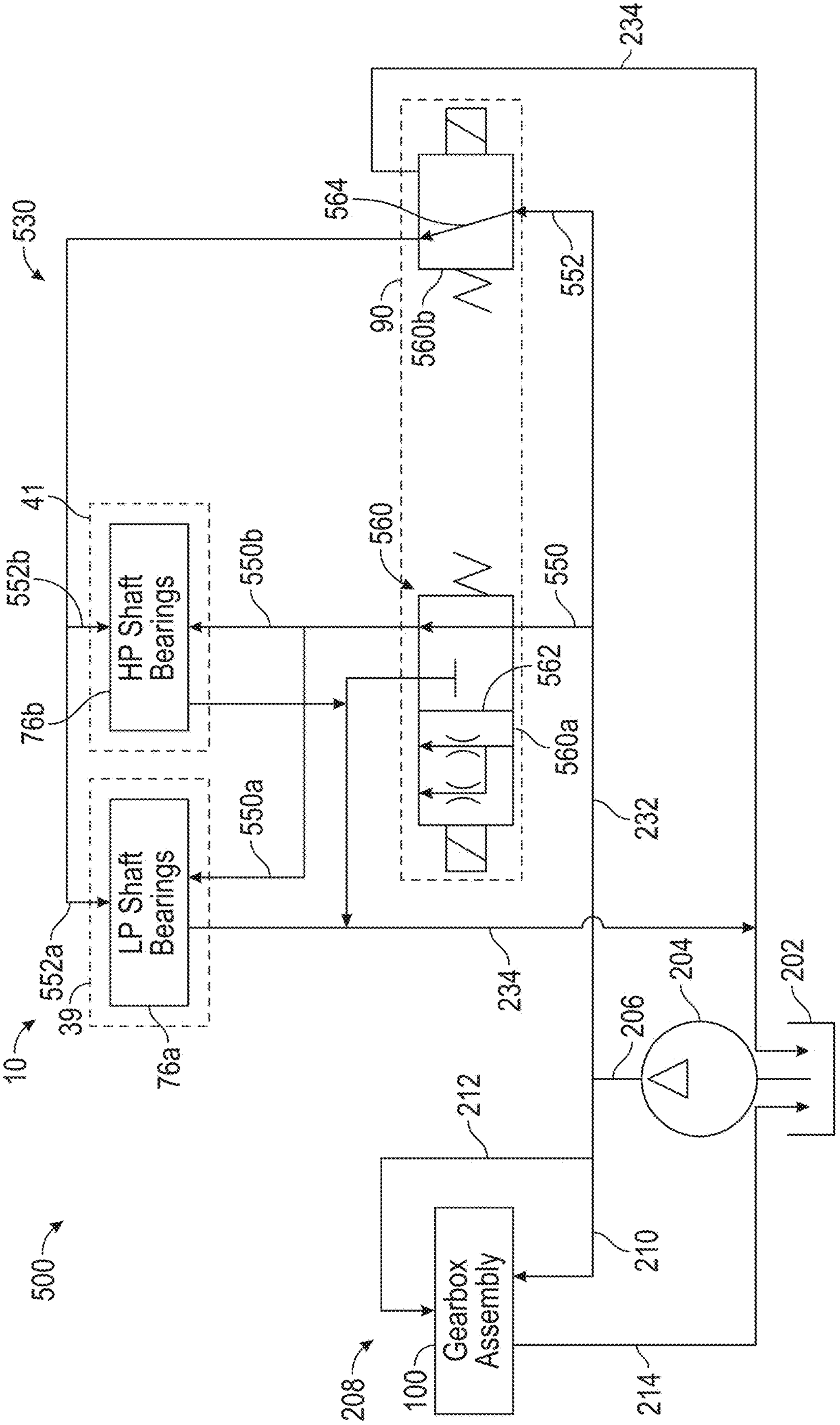
FIG. 8 is a schematic diagram of a lubrication system for the gas turbine engine of FIG. 1, according to an embodiment of the present disclosure.

FIG. 8 is a schematic diagram of a lubrication system 500 for the gas turbine engine 10, according to another embodiment. The lubrication system 500 is substantially similar to the lubrication system 200 of FIG. 5. The same reference numerals or similar reference numerals will be used for components of the lubrication system 500 that are the same as or similar to the components of the lubrication system 200 discussed above. The description of these components above also applies to this embodiment, and a detailed description of these components is omitted here.

As shown in FIG. 8, the gas turbine engine 10 includes one or more LP shaft sumps 39 and one or more HP shaft sumps 41. The LP shaft sumps 39 are in fluid communication with the LP shaft bearings 76*a*. The HP shaft sumps 41 are in fluid communication with the HP shaft bearings 76*b*. The LP shaft sumps 39 collect the lubricant that drains from the LP shaft bearings 76*a*. The HP shaft sumps 41 collect the lubricant that drains from the HP shaft bearings 76*b*.

The lubrication system 500 includes a gas turbine engine lubrication system 530 including the engine lubricant supply lines 232 and the engine lubricant return lines 234. The engine lubricant supply lines 232 include one or more primary engine lubricant supply lines 550 and one or more secondary engine lubricant supply lines 552.

The one or more primary engine lubricant supply lines 550 include a first primary engine lubricant supply line 550*a* and a second primary engine lubricant supply line 550*b*. The first primary engine lubricant supply line 550*a* is in fluid communication with the LP shaft bearings 76*a* for supplying the lubricant to the LP shaft bearings 76*a*. The second primary engine lubricant supply line 550*b* is in fluid communication with the HP shaft bearings 76*b* for supplying the lubricant to the HP shaft bearings 76*b*.

The one or more secondary engine lubricant supply lines 552 include a first secondary engine lubricant supply line 552*a* and a second secondary engine lubricant supply lines 552*b*. The first secondary engine lubricant supply line 552*a* is in fluid communication with the LP shaft bearings 76*a* for supplying the lubricant to the LP shaft bearings 76*a*. The second secondary engine lubricant supply line 552*b* is in fluid communication with the HP shaft bearings 76*b* for supplying the lubricant to the HP shaft bearings 76*b*.

The gas turbine engine lubrication system 530 includes one or more valves 560 disposed in the one or more lubricant supply lines 206 for modulating a flow of the lubricant to the gas turbine engine 10 (e.g., the LP shaft bearings 76*a* and the HP shaft bearings 76*b*). In particular, the one or more valves 560 includes a primary valve 560*a* and an secondary valve 560*b*. The primary valve 560*a* is in fluid communication with the primary engine lubricant supply lines 550. The secondary valve 560*b* is in fluid communication with the secondary engine lubricant supply lines 552. The valves 560 can include at least one of the primary valve 560*a* or the secondary valve 560*b*. For example, the valves 560 can include only the primary valve 560*a*, only the secondary valve 560*b*, or both the primary valve 560*a* and the secondary valve 560*b*.

The primary valve 560*a* is a proportional modulating valve (PMV) that includes a primary valve member 562 that moves between a fully opened positioned and a fully closed position to modulate the flow of the lubricant through the primary engine lubricant supply lines 550. The primary valve 560*a* is a control valve that is controlled by the controller 90. In particular, the primary valve 560*a* is in communication with the controller 90 such that the controller 90 controls the primary valve 560*a* to move the primary valve member 562 between the fully opened position and the fully closed position, as detailed further below. In some embodiments, the primary valve 560*a* can be a passive valve that is controlled by, for example, the pressure of the lubricant, rather than by the controller 90. In the fully opened position, the primary valve 560*a* allows the lubricant to fully flow through the primary engine lubricant supply lines 550. In the fully closed position, the primary valve 560*a* prevents the lubricant from flowing through the primary engine lubricant supply lines 550. The primary valve 560*a* can move the primary valve member 562 anywhere between the fully opened position and the fully closed position to modulate the flow of the lubricant through the primary engine lubricant supply lines 550.

The secondary valve 560*b* is a shut-off valve (SOV) that includes an secondary valve member 564 that moves between an opened position and a closed position. The secondary valve 560*b* is a control valve that is controlled by the controller 90. In particular, the secondary valve 560*b* is in communication with the controller 90 such that the controller 90 controls the secondary valve 560*b* to move the secondary valve member 564 between the opened position and the closed position. In some embodiments, the secondary valve 560*b* can be a passive valve that is controlled by, for example, the pressure of the lubricant, rather than by the controller 90. In the opened position, the secondary valve 560*b* allows the lubricant to fully flow through the secondary engine lubricant supply lines 552. In the closed position, the secondary valve 560*b* prevents the lubricant from flowing through the secondary engine lubricant supply lines 552.

The engine lubricant return lines 234 are in fluid communication with the LP shaft bearings 76*a* and the HP shaft bearings 76*b* for returning the lubricant to the lubricant tank 202. In particular, the LP shaft sumps 39 and the HP shaft sumps 41 are in fluid communication with the engine lubricant return lines 234 for returning the lubricant to the lubricant tank 202 from the LP shaft sumps 39 and the HP shaft sumps 41.

In operation, the lubrication system 500 modulates the flow of the lubricant to the gas turbine engine 10, similar to the modulation of the lubricant to the gearbox assembly 100 as detailed above with respect to FIG. 4.

During the high-power operation (e.g., the rotational speed of the at least one of the HP shaft 36 or the LP shaft 40 is greater than a threshold), the primary valve 560*a* is in the fully opened position and the secondary valve 560*b* is in the opened position. In this way, the lubricant flows at a first mass flow rate ($\dot{m}_1$) through the primary engine lubricant supply lines 550 to the gas turbine engine 10 (e.g., through the first primary engine lubricant supply line 550*a* to the LP shaft bearings 76*a* and through the second primary engine lubricant supply line 550*b* to the HP shaft bearings 76*b*). The first mass flow rate is at a maximum first mass flow rate ($\dot{m}_1$) when the primary valve 560*a* is in the fully opened position. Similarly, the lubricant flows at a second mass flow rate ($\dot{m}_2$) through the secondary engine lubricant supply lines 552 (through the first secondary engine lubricant supply line 552*a* to the LP shaft bearings 76*a* and through the second secondary engine lubricant supply line 552*b* to the HP shaft bearings 76*b*). The second mass flow rate ($\dot{m}_2$) is at a maximum when the secondary valve 560*b* is in the opened position. In this way, the lubricant flows at a total mass flow rate ($\dot{m}_{total}$) to the gas turbine engine 10 that is a sum of the first mass flow ($\dot{m}_1$) and the second mass flow rate ($\dot{m}_2$). The total mass flow rate ($\dot{m}_{total}$) is at a maximum total mass flow rate when the primary valve 560*a* is in the fully opened position and the secondary valve 560*b* is in the opened position.

During the low-power operation or the mid-power operation (e.g., the rotational speed of the at least one of the HP shaft 36 or the LP shaft 40 is less than a threshold), the primary valve 560*a* is in a partially opened position (e.g., between the fully opened position and the fully closed position) and the secondary valve 560*b* is in the closed position. In this way, the first mass flow rate ($\dot{m}_1$) of the lubricant through the primary engine lubricant supply lines 550 to the gas turbine engine 10 is less than the maximum first mass flow rate (and greater than zero) in the partially opened position. The second mass flow rate ($\dot{m}_2$) of the lubricant through the secondary engine lubricant supply lines 552 is zero in the closed position. In this way, the total mass flow rate ($\dot{m}_{total}$) of the lubricant to the gas turbine engine 10 is less than the maximum total mass flow rate. The primary valve 560*a* directs a portion of the lubricant to the lubricant tank 202 (e.g., through the engine lubricant return lines 234) and directs a portion of the lubricant to the gas turbine engine 10 through the primary engine lubricant supply lines 550 when the primary valve 560*a* is in the partially opened position. The secondary valve 560*b* directs the lubricant to the lubricant tank 202 (through the engine lubricant return lines 234) and prevents the lubricant from flowing to the gas turbine engine 10 through the secondary engine lubricant supply lines 552 when the secondary valve 560*b* is in the closed position. In this way, the total mass flow rate ($\dot{m}_{total}$) of the lubricant to the gas turbine engine 10 is equal to the first mass flow rate ($\dot{m}_1$) when the secondary valve 560*b* is in the closed position. The controller 90 can control the primary valve 560*a* to modulate the flow of the lubricant through the primary engine lubricant supply lines 550 by moving the primary valve member 562 between the fully opened position and the fully closed position during the low-power conditions. In some embodiments, the primary valve 560*a* or the secondary valve 560*b* can be excluded. For example, the lubrication system 500 can include only the primary valve 560*a*, and not the secondary valve 560*b*, such that the lubrication system 500 modulates the flow of the lubricant to the gas turbine engine 10 with only the primary valve 560*a*. In some embodiments, the lubrication system 500 can include only the secondary valve 560*b*, and not the primary valve 560*a*, such that the lubrication system 500 modulates the flow of the lubricant with only the secondary valve 560*b*.

Thus, the lubrication systems 200, 300, 400, and 500 provide an amount of the lubricant and a temperature of the lubricant for reducing damage to the gears, while minimizing gearbox losses (e.g., due to friction and windage of the gears) and maximizing the gearbox efficiency for all operating conditions of the gearbox assembly 100 over the entire operating cycle of the gas turbine engine 10 by modulating the lubricant flow to the gearbox assembly 100. The lubrication system 400 similarly reduces damage to the rotating components of the electric machine 92 while minimizing losses and maximizing efficiency of the electric machine 92 over the entire operating cycle of the gas turbine engine 10 by modulating the lubricant flow to the electric machine 92. The lubrication system 500 reduces damage to the LP shaft bearings 76*a* or the HP shaft bearings 76*b* (or LP shaft dampers or HP shaft dampers), while minimizing losses and maximizing efficiency of the bearings 76*a* and 76*b* over the entire operating cycle of the gas turbine engine 10 by modulating the lubricant flow to the bearings 76*a* and 76*b* (or to the dampers). Further, having two lubricant supply lines allows for the lubricant flow to scale linearly with the engine speed by reducing the number of orifices (e.g., the total orifice area) when one line is turned off, while also allowing the lubricant to be modulated.

Referring back to FIG. 3, as the volume of the gearbox 101 increases, the diameter of the gearbox $D_{GB}$, increases. As the power output of the gearbox 101 increases the amount of heat generated increases. The increase in heat generation increases the volume of lubricant required to operate the gearbox, which calls for an increased gutter volume $V_G$ for capture and recirculation of lubricant through the scavenging system. However, it is also desired to reduce the overall footprint of the gearbox, lubricant and scavenge system given an emphasis on decreasing packaging space available for the gearbox and lubricant scavenge system, especially for engines with power gearboxes operating with relatively high gear ratios, e.g., between, inclusive of the endpoints, 2.5 to 3.5, 3.0, 3.25, 4.0, and above gear ratios (GRs).

In view of the foregoing, it is desirable to improve, or at least maintain, a target efficiency of a gearbox without oversizing a gutter or scavenge system, or while reducing its size to accommodate only what is needed or can be accommodated in terms of weight increase or volume. When developing a gas turbine engine, the interplay among components can make it particularly difficult to select or to develop one component (e.g., the gutter 114) during engine design and prototype testing, especially, when some components are at different stages of completion. For example, one or more components may be nearly complete, yet one or more other components may be in an initial or preliminary phase. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, various aspects of the fan section 14 design, compressor section 22 design, combustion section 28, or turbine section 30 design, may not be known at the time of design of the gutter, but such components impact the size of the gearbox 101 required and the amount of lubricant required, and thus, the design of the gutter 114.

The inventors desire to arrive at a more favorable balance between maximizing gearbox scavenge flow collection while minimizing other, potential negative effects on an improperly chosen gutter size had previously involved, e.g., the undertaking of multivariate trade studies, which may or may not have yielded an improved, or best match gutter/scavenge for a particular architecture. Unexpectedly, it was discovered that a relationship exists between the volume of the gutter and gearbox volume that uniquely identified a finite and readily ascertainable (in view of this disclosure) number of embodiments suited for a particular architecture, which improves the weight-volume-scavenge effectiveness tradeoffs for a particular architecture. This relationship the inventors refer to as the Lubricant Extraction Volume Ratio (LEVR):

$$LEVR = \frac{V_G}{V_{GB}} \tag{1}$$

$V_G$ represents the gutter volume, as identified with respect to FIGS. 2 and 3. The gutter volume may be determined by calculating the volume within a cross section of the gutter. $V_{GB}$ represents the gearbox volume, which is defined below (2). For engine power between eighteen kHP and thirty-five kHP, inclusive of the endpoints, the gearbox volume $V_{GB}$ is between eight hundred $in^3$ and two thousand $in^3$, inclusive of the endpoints. In some examples, the engine is a turbofan engine. The inventors found that the gutter volume $V_G$ should be selected based on the range 0.01≤LEVR≤to 0.3 (gutter volume is between 1 percent and 30 percent the gearbox volume, inclusive of the endpoints).

$$V_{GB} = L_{GB} * \pi * \left(\frac{D_{GB}}{2}\right)^2 \tag{2}$$

$L_{GB}$ represents the gearbox length, as identified with respect to FIG. 2. Although described with respect to gears of the same length in FIG. 2, the gearbox length may be defined by any of the sun gear 102, a planet gear 104, or the ring gear 106, instances when the aforementioned gears are of different lengths. In (2), $D_{GB}$ represents the gearbox diameter, as identified with respect to FIG. 3.

Figure 9:
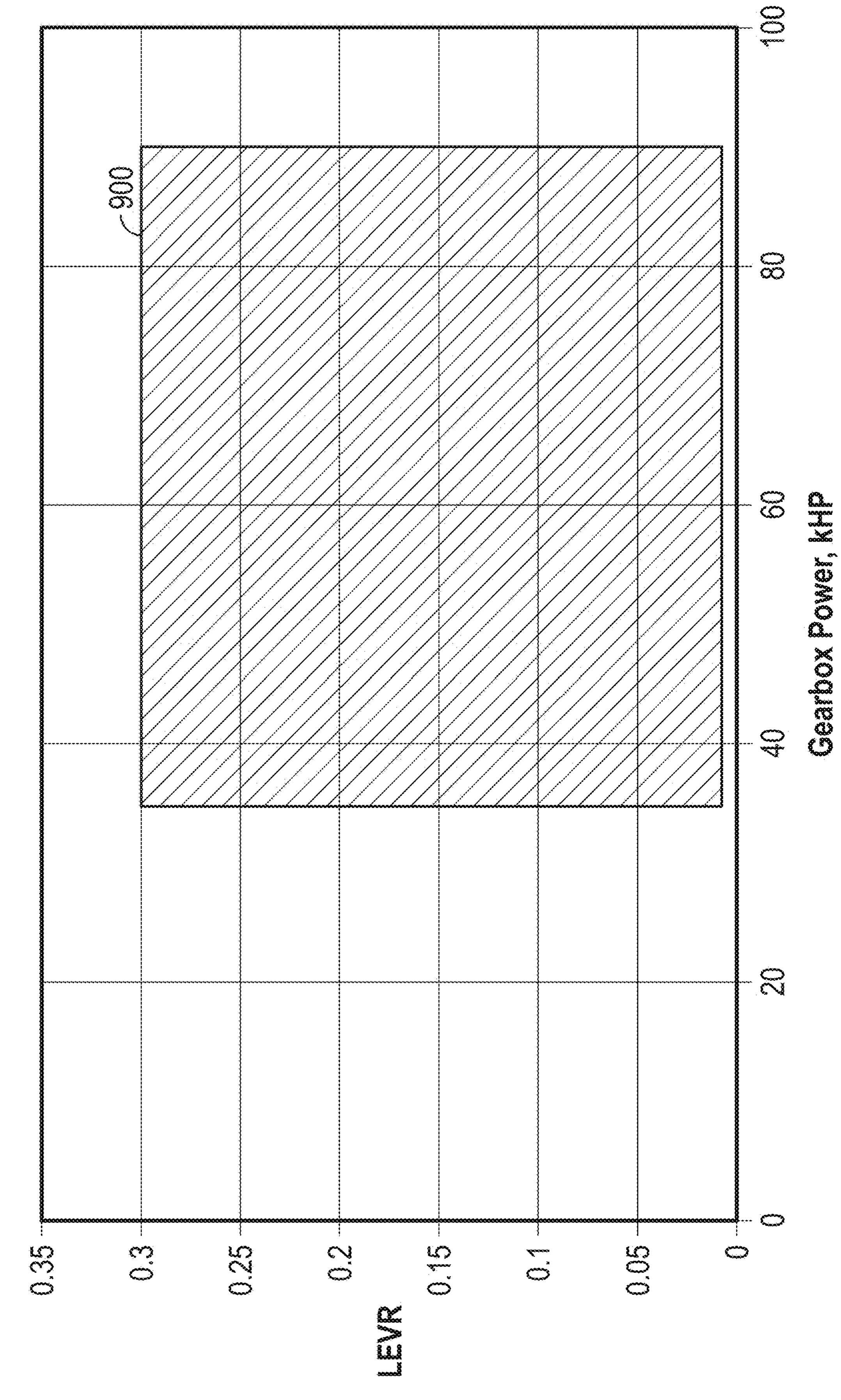
FIG. 9 illustrates a graph showing the lubricant extraction volume ratio as a function of gearbox power, according to an embodiment of the present disclosure.
Figure 10:
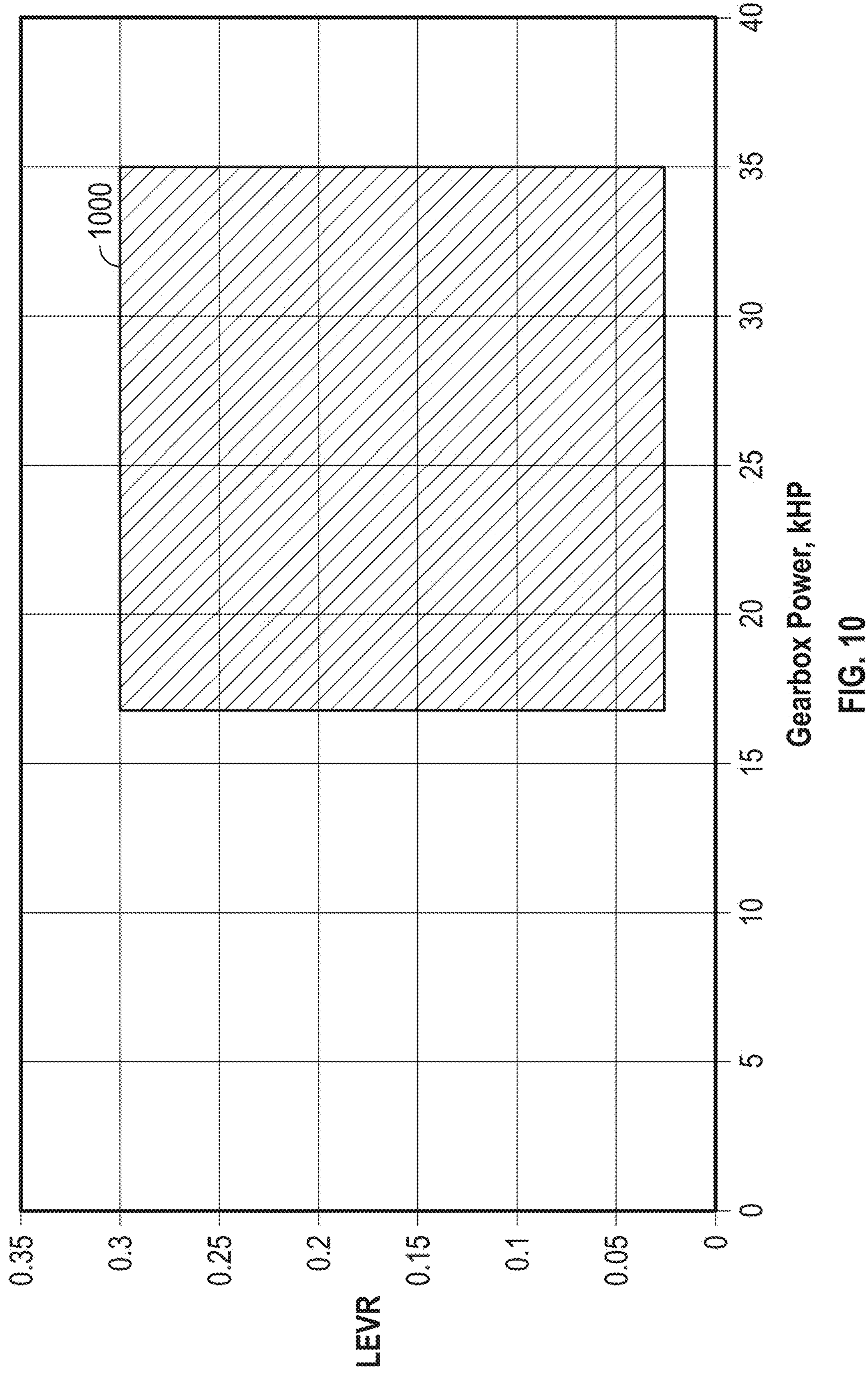
FIG. 10 illustrates a graph showing the lubricant extraction volume ratio as a function of gearbox power, according to an embodiment of the present disclosure.

In some embodiments, and as shown in a region 900 in FIG. 9, LEVR is between 0.01 and 0.3, inclusive of the endpoints, for maximum gearbox power of between thirty-five kHP and ninety kHP, inclusive of the endpoints. In some embodiments, and as shown in a region 1000 in FIG. 10, LEVR is between 0.03 and 0.3, inclusive of the endpoints, for a maximum gearbox power of less than or equal to thirty-five kHP.

If the gutter volume relative to the gearbox volume is such that the LEVR upper limit is exceeded (e.g., a "large gutter"), there is too large of a volume within the gutter than is needed to recover gearbox lubricant scavenge, which can lead to increased lubricant churning loss and lubricant foaming in the gutter, leading to increased power loss in the overall gearbox assembly. The foaming in the gutter can generate drag in the gutter and negatively impact gearbox performance, and ultimately, engine performance. Furthermore, a large gutter requires more radial space and the increased material, mass, and size, etc., of the large gutter encroaches upon other system components within the engine (e.g., the core flow path), which, again, negatively impacts gearbox performance. The LEVR is selected to balance recovery of gearbox lubricant scavenge and impact to the engine operation and efficiency.

If the gutter volume relative to the gearbox volume is such that the LEVR lower limit is violated (e.g., a "small gutter"), there is too small of a volume within the gutter than is needed to recover the gearbox lubricant scavenge. The gutter will not fully capture the gearbox lubricant scavenge (e.g., flow $F_2$), leading to inadequate removal of the lubricant from the gearbox sump. This can lead to leakage of the scavenge lubricant back into the gearbox or to other areas of the engine, negatively impacting the performance of both the gearbox and the engine. The lower limit of the LEVR is selected to balance recovery of gearbox lubricant scavenge and impact to the gearbox and engine operation and efficiency (e.g., volume & weight penalty).

Taking into consideration the above considerations for selecting upper and lower limits, the LEVR may also be defined in terms of a Power Factor, Flow Transition Time and a Heat Density Parameter:

$$LEVR = PF * \frac{FT}{HDP} \tag{3}$$

where PF represents the Power Factor, FT represents the Flow Transition Time, and HDP represents the Heat Density parameter. The Power Factor PF is defined in (4):

$$PF = PD * (1 - \eta) \tag{4}$$

where PD represents the gearbox power density and $\eta$ represents the gearbox efficiency. The power density PD is a ratio of the power of the gearbox to the volume of the gearbox and is between fifteen thousand $hp/ft^3$ and forty-five thousand $hp/ft^3$, inclusive of the endpoints. The gearbox efficiency is between 99.2 percent and 99.8 percent, inclusive of the endpoints.

The Flow Transition Time FT is given by:

$$FT = \frac{V_G}{V_{dot}} \tag{5}$$

where $V_G$ represents the gutter volume, as identified with respect to FIGS. 2 and 3. $V_{dot}$ represents the lubricant volumetric flow rate. The lubricant volumetric flow rate is defined by the gearbox power and the efficiency. Since the inefficiency of the gearbox generates heat, a certain quantity of lubricant is required to remove the heat. The Flow Transition Time is the time it takes the lubricant to traverse the entire gutter volume. The Flow Transition Time indirectly links the gutter volume to the gearbox volume. The Flow Transition Time is between 1.5 and eleven seconds, inclusive of the endpoints.

The Heat Density parameter HDP is defined as:

$$HDP=\rho*C*\Delta T \quad (6)$$

where ρ represents the fluid density, C represents the lubricant specific heat, and ΔT represents the temperature rise in the lubricant, which, is between twenty degrees Celsius and forty-five degrees Celsius, inclusive of the endpoints.

Table 1 describes exemplary embodiments 1 and 2 identifying the LEVR for various engines. The embodiments 1 and 2 are for narrow body, turbofan engines. The LEVR of the present disclosure is not limited to such engines, however, and may be applicable over a wide range of thrust class and engine designs, including, for example, wide body engines. In some examples, the engine may include, but is not limited to, business jet propulsion engines, small turbofan engines, open rotor engines, marine and industrial turbine engines, including portable power generation units, and marine propulsion for ships.

TABLE 1

| Embodiments | Power (kHP) | $V_G$ (in^3) | $V_{GB}$ (in^3) | LEVR |
|---|---|---|---|---|
| 1 | 20-30 | 253 | 5601 | .045 |
| 2 | 17 | 37 | 691 | .054 |

As the gearbox power, and, thus, the gearbox size/volume increases, the gutter volume also must increase to ensure proper function of the gutter. However, the relationship between LEVR and gearbox (fan) power is not linear. Furthermore, different gearbox configurations like planetary and differential could require more lubricant flow due to the lower efficiency compared to a star gearbox configuration. Therefore, these higher power gearboxes with different operating configurations could yield LEVR nearing 0.3. Accordingly, for star gearbox configurations, Table 1 shows this relationship.

Accordingly, the gutter volume is critical to minimizing the lubricant scavenge losses as the lubricant exits the gearbox and is redirected to the scavenge port of the gutter.

Therefore, the present disclosure defines a lubricant extraction volume ratio that improves or maintains gearbox efficiency, while ensuring the gutter provided with the gearbox is not oversized or undersized with respect to the needs of the gearbox. By maintaining the gutter within the range defined by the lubricant extraction volume ratio, scavenge flow collection is maximized and the negative effects of the gutter (e.g., added weight and size to the system) that may contribute to a reduction in gearbox efficiency are minimized.

Further aspects of the present disclosure are provided by the subject matter of the following clauses.

According to an aspect of the present disclosure, a gearbox assembly comprises a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gearbox assembly of the preceding clause, wherein the lubricant extraction volume ratio is between 0.03 and 0.3, inclusive of the endpoints, for a gearbox power less than or equal to thirty-five kHP.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gutter volume is defined by an inner surface of a gutter wall of the gutter.

The gearbox assembly of any preceding clause, wherein the gearbox volume is defined by an outer diameter of the gearbox and a gearbox length of the gearbox.

The gearbox assembly of any preceding clause, wherein the outer diameter of the gearbox is an outer diameter of a ring gear.

The gearbox assembly of any preceding clause, wherein the gearbox length is defined between a forwardmost end of a gear of the gearbox and an aftmost end of the gear.

The gearbox assembly of any preceding clause, wherein the gearbox includes a sun gear, a plurality of planet gears, and a ring gear.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gearbox volume is defined by an outer diameter of the ring gear and a length of the gearbox.

The gearbox assembly of any preceding clause, wherein the lubricant extraction volume ratio is defined by a power factor, a flow transition time, and a heat density parameter.

The gearbox assembly of any preceding clause, wherein the flow transition time is defined by a gutter volume of the gutter and a lubricant volumetric flow rate of a lubricant through the gearbox.

The gearbox assembly of any preceding clause, wherein the flow transition time is between 1.5 seconds and eleven seconds, inclusive of the endpoints.

The gearbox assembly of any preceding clause, wherein the power factor is defined by a power density of the gearbox and an efficiency of the gearbox.

The gearbox assembly of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gearbox assembly of any preceding clause, wherein the gearbox includes a sun gear, a plurality of planet gears, and a ring gear, and wherein the gutter circumscribes the ring gear.

The gearbox assembly of any preceding clause, wherein the gutter wholly circumscribes the ring gear.

The gearbox assembly of any preceding clause, wherein the gutter partially circumscribes the ring gear.

The gearbox assembly of any preceding clause, wherein the gutter is located radially outward of the gearbox.

The gearbox assembly of any preceding clause, wherein the gutter further comprises a scavenge port located near a bottom of the gutter.

The gearbox assembly of any preceding clause, wherein the gearbox is a star configuration.

The gearbox assembly of any preceding clause, wherein the gearbox is a planetary configuration.

The gearbox assembly of any preceding clause, wherein the gearbox is a differential gearbox.

The gearbox assembly of any preceding clause, wherein the gearbox volume is between eight hundred $in^3$ and two thousand $in^3$, inclusive of the endpoints, when the engine power is between eighteen kHP and thirty-five kHP, inclusive of the endpoints.

The gearbox assembly of any preceding clause, wherein the gutter volume is between 0.01 and 0.3 times, inclusive of the endpoints, the gearbox volume.

According to an aspect of the present disclosure, a gas turbine engine comprises a gearbox assembly comprising a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gas turbine engine of the preceding clause, wherein the lubricant extraction volume ratio is between 0.01 and 0.3, inclusive of the endpoints, when the gas turbine engine has an engine power greater than or equal to thirty-five kHP.

The gas turbine engine of any preceding clause, wherein the engine power is between thirty-five kHP and ninety kHP, inclusive of the endpoints.

The gas turbine engine of any preceding clause, wherein the lubricant extraction volume ratio is between 0.03 and 0.3, inclusive of the endpoints.

The gas turbine engine of any preceding clause, wherein the lubricant extraction volume ratio is between 0.03 and 0.3, inclusive of the endpoints, when the gas turbine engine has an engine power less than or equal to thirty-five kHP.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gutter volume is defined by an inner surface of a gutter wall of the gutter.

The gas turbine engine of any preceding clause, wherein the gearbox volume is defined by an outer diameter of the gearbox and a gearbox length of the gearbox.

The gas turbine engine of any preceding clause, wherein the outer diameter of the gearbox is an outer diameter of a ring gear.

The gas turbine engine of any preceding clause, wherein the gearbox length is defined between a forwardmost end of a gear of the gearbox and an aftmost end of the gear.

The gas turbine engine of any preceding clause, wherein the gearbox includes a sun gear, a plurality of planet gears, and a ring gear.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gearbox volume is defined by an outer diameter of the ring gear and a length of the gearbox.

The gas turbine engine of any preceding clause, wherein the lubricant extraction volume ratio is defined by a power factor, a flow transition time, and a heat density parameter.

The gas turbine engine of any preceding clause, wherein the power factor is defined by a power density of the gearbox and an efficiency of the gearbox.

The gas turbine engine of any preceding clause, wherein the power density is between fifteen thousand $hp/ft^3$ and forty-five thousand $hp/ft^3$, inclusive of the endpoints, and the efficiency is between 99.2 percent and 99.8 percent, inclusive of the endpoints.

The gas turbine engine of any preceding clause, wherein the flow transition time is defined by a gutter volume of the gutter and a lubricant volumetric flow rate of a lubricant through the gearbox.

The gas turbine engine of any preceding clause, wherein the flow transition time is between 1.5 seconds and eleven seconds, inclusive of the endpoints.

The gas turbine engine of any preceding clause, wherein the gearbox includes a sun gear, a plurality of planet gears, and a ring gear, and wherein the gutter circumscribes the ring gear.

The gas turbine engine of any preceding clause, wherein the gutter wholly circumscribes the ring gear.

The gas turbine engine of any preceding clause, wherein the gutter partially circumscribes the ring gear.

The gas turbine engine of any preceding clause, wherein the gutter is located radially outward of the gearbox.

The gas turbine engine of any preceding clause, wherein the gutter further comprises a scavenge port located near a bottom of the gutter.

The gas turbine engine of any preceding clause, wherein the gearbox is a star configuration.

The gas turbine engine of any preceding clause, wherein the gearbox is a planetary configuration.

The gas turbine engine of any preceding clause, wherein the gearbox is a differential gearbox.

The gas turbine engine of any preceding clause, wherein the gearbox volume is between eight hundred $in^3$ and two thousand $in^3$, inclusive of the endpoints, when the engine power is between eighteen kHP and thirty-five kHP, inclusive of the endpoints.

The gas turbine engine of any preceding clause, wherein the gutter volume is between 0.01 and 0.3 times, inclusive of the endpoints, the gearbox volume.

A gas turbine engine comprising a turbo-engine including a compressor section, a combustion section, and a turbine section, the turbo-engine having a turbo-engine shaft that couples the compressor section to the turbine section, a fan section having a fan shaft, a gearbox assembly, the fan shaft being drivingly coupled to the turbo-engine shaft through the gearbox assembly, the gearbox assembly comprising a gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by $$\frac{V_G}{V_{GB}},$$

wherein $V_G$ is the gutter volume of the gutter and $V_{GB}$ is the gearbox volume, and a lubrication system comprising a lubricant tank that stores lubricant therein, one or more primary gearbox lubricant supply lines in fluid communication with the lubricant tank and the gearbox assembly, one or more secondary gearbox lubricant supply lines in fluid communication with the lubricant tank and the gearbox assembly, and a lubricant pump for supplying the lubricant to the gearbox assembly from the lubricant tank through the one or more primary gearbox lubricant supply lines and the one or more secondary gearbox lubricant supply lines, the lubrication system modulating a mass flow rate of the lubricant to the gearbox assembly through at least one of the one or more primary gearbox lubricant supply lines or the one or more secondary gearbox lubricant supply lines.

The gas turbine engine of the preceding clause, further comprising an electric machine drivingly coupled to the turbo-engine shaft, wherein the lubrication system further comprises one or more primary electric machine lubricant supply lines in fluid communication with the lubricant tank and the electric machine, and one or more secondary electric machine lubricant supply lines in fluid communication with the lubricant tank and the electric machine, wherein the lubricant pump supplies the lubricant to the electric machine from the lubricant tank through the one or more primary electric machine lubricant supply lines and the one or more secondary electric machine lubricant supply lines, the lubrication system modulating a mass flow rate of the lubricant to the electric machine through at least one of the one or more primary electric machine lubricant supply lines or the one or more secondary electric machine lubricant supply lines.

The gas turbine engine of any preceding clause, further comprising one or more engine bearings that support rotation of the turbo-engine shaft, wherein the lubrication system further comprises one or more primary engine lubricant supply lines in fluid communication with the lubricant tank and the one or more engine bearings, and one or more secondary engine lubricant supply lines in fluid communication with the lubricant tank and the one or more engine bearings, wherein the lubricant pump supplies the lubricant to the one or more engine bearings from the lubricant tank through the one or more primary engine lubricant supply lines and the one or more secondary engine lubricant supply lines, the lubrication system modulating a mass flow rate of the lubricant to the gas turbine engine through at least one of the one or more primary engine lubricant supply lines or the one or more secondary engine lubricant supply lines.

The gas turbine engine of any preceding clause, wherein the gearbox has a plurality of gears that meshes with each other at a mesh, the one or more primary gearbox lubricant supply lines and the one or more secondary gearbox lubricant supply lines directing the lubricant to the mesh.

The gas turbine engine of any preceding clause, wherein the one or more primary gearbox lubricant supply lines include a first primary gearbox lubricant supply line in fluid communication with the mesh.

The gas turbine engine of any preceding clause, wherein the one or more secondary gearbox lubricant supply lines include a first secondary gearbox lubricant supply line in fluid communication with the mesh.

The gas turbine engine of any preceding clause, wherein the gearbox includes one or more bearings, the one or more primary gearbox lubricant supply lines and the one or more secondary gearbox lubricant supply lines directing the lubricant to the one or more bearings.

The gas turbine engine of any preceding clause, wherein the one or more primary gearbox lubricant supply lines include a second primary gearbox lubricant supply line in fluid communication with the one or more bearings.

The gas turbine engine of any preceding clause, wherein the one or more secondary gearbox lubricant supply lines include a second secondary gearbox lubricant supply line in fluid communication with the one or more bearings.

The gas turbine engine of any preceding clause, wherein the lubrication system further comprises one or more valves disposed in at least one of the one or more primary gearbox lubricant supply lines or the one or more primary gearbox lubricant supply lines for modulating the mass flow rate of the lubricant to the gearbox assembly.

The gas turbine engine of any preceding clause, wherein the one or more valves include a primary valve disposed in the one or more primary gearbox lubricant supply lines for modulating the mass flow rate of the lubricant to the gearbox assembly through the one or more primary gearbox lubricant supply lines.

The gas turbine engine of any preceding clause, wherein the primary valve is a proportional modulating valve that includes a primary valve member that moves between a fully opened position and a fully closed position to modulate the mass flow rate of the lubricant through the one or more primary gearbox lubricant supply lines.

The gas turbine engine of any preceding clause, wherein the one or more valves include an secondary valve disposed in the one or more secondary gearbox lubricant supply lines for modulating the mass flow rate of the lubricant to the gearbox assembly through the one or more secondary gearbox lubricant supply lines The gas turbine engine of any preceding clause, wherein the secondary valve is a shut-off valve that includes an secondary valve member that moves between an opened position and a closed position to turn on or to turn off the lubricant through the one or more secondary gearbox lubricant supply lines.

A gas turbine engine comprising a turbo-engine including a compressor section, a combustion section, and a turbine section, the turbo-engine having a turbo-engine shaft that couples the compressor section to the turbine section, a fan section having a fan shaft, a gearbox assembly, the fan shaft being drivingly coupled to the turbo-engine shaft through the gearbox assembly, the gearbox assembly comprising a gearbox including a plurality of gears that mesh with each other at a mesh and having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by, $$\frac{V_G}{V_{GB}},$$

wherein $V_G$ is the gutter volume of the gutter and $V_{GB}$ is the gearbox volume, and a lubrication system comprising a lubricant tank that stores lubricant therein, one or more primary gearbox lubricant supply lines in fluid communication with the lubricant tank and the gearbox assembly, wherein the one or more primary gearbox lubricant supply lines direct the lubricant to the mesh, one or more secondary gearbox lubricant supply lines in fluid communication with the lubricant tank and the gearbox assembly, wherein the one or more secondary gearbox lubricant supply lines direct the lubricant to the mesh, one or more valves disposed in at least one of the one or more primary gearbox lubricant supply lines or the one or more primary gearbox lubricant supply lines, and a lubricant pump for supplying the lubricant to the mesh from the lubricant tank through the one or more primary gearbox lubricant supply lines and the one or more secondary gearbox lubricant supply lines, the lubrication system controlling the one or more valves to modulate a mass flow rate of the lubricant to the mesh through the at least one of the one or more primary gearbox lubricant supply lines or the one or more secondary gearbox lubricant supply lines.

The gas turbine engine of the preceding clause, further comprising an electric machine drivingly coupled to the turbo-engine shaft, wherein the lubrication system further comprises one or more primary electric machine lubricant supply lines in fluid communication with the lubricant tank and the electric machine, and one or more secondary electric machine lubricant supply lines in fluid communication with the lubricant tank and the electric machine, wherein the lubricant pump supplies the lubricant to the electric machine from the lubricant tank through the one or more primary electric machine lubricant supply lines and the one or more secondary electric machine lubricant supply lines, the lubrication system modulating a mass flow rate of the lubricant to the electric machine through at least one of the one or more primary electric machine lubricant supply lines or the one or more secondary electric machine lubricant supply lines.

The gas turbine engine of any preceding clause, further comprising one or more engine bearings that support rotation of the turbo-engine shaft, wherein the lubrication system further comprises one or more primary engine lubricant supply lines in fluid communication with the lubricant tank and the one or more engine bearings, and one or more secondary engine lubricant supply lines in fluid communication with the lubricant tank and the one or more engine bearings, wherein the lubricant pump supplies the lubricant to the one or more engine bearings from the lubricant tank through the one or more primary engine lubricant supply lines and the one or more secondary engine lubricant supply lines, the lubrication system modulating a mass flow rate of the lubricant to the gas turbine engine through at least one of the one or more primary engine lubricant supply lines or the one or more secondary engine lubricant supply lines.

The gas turbine engine of any preceding clause, wherein the gearbox includes one or more bearings, the one or more primary gearbox lubricant supply lines and the one or more secondary gearbox lubricant supply lines directing the lubricant to the one or more bearings.

The gas turbine engine of any preceding clause, wherein the one or more valves include a primary valve disposed in the one or more primary gearbox lubricant supply lines for modulating the mass flow rate of the lubricant to the mesh through the one or more primary gearbox lubricant supply lines.

The gas turbine engine of any preceding clause, wherein the one or more valves include an secondary valve disposed in the one or more secondary gearbox lubricant supply lines for modulating the mass flow rate of the lubricant to the mesh through the one or more secondary gearbox lubricant supply lines.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gas turbine engine comprising:

a turbo-engine including a compressor section, a combustion section, and a turbine section, the turbo-engine having a turbo-engine shaft that couples the compressor section to the turbine section;

a fan section having a fan shaft;

a gearbox assembly, the fan shaft being drivingly coupled to the turbo-engine shaft through the gearbox assembly, the gearbox assembly comprising:

a gearbox having a plurality of gears and a gearbox volume defined by an outer diameter of the gearbox and a gearbox length of the gearbox; and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by:

$$\frac{V_G}{V_{GB}},$$

wherein $V_G$ is the gutter volume of the gutter and $V_{GB}$ is the gearbox volume; and a lubrication system comprising:

a lubricant tank that stores lubricant therein;

a primary gearbox lubricant supply line in fluid communication with the lubricant tank and a component of the gearbox assembly;

a secondary gearbox lubricant supply line in fluid communication with the lubricant tank and the component of the gearbox assembly in parallel with the primary gearbox lubricant supply line;

a lubricant pump for supplying the lubricant to the component of the gearbox assembly from the lubricant tank through the primary gearbox lubricant supply line and the secondary gearbox lubricant supply line in parallel;

a primary valve disposed in the primary gearbox lubricant supply line, the primary valve including a primary valve member that moves between a fully opened position and a fully closed position; and a controller having one or more processors and a memory, the controller configured to control the primary valve between the fully opened position and the fully closed position to modulate a mass flow rate of the lubricant through the primary gearbox lubricant supply line to the gearbox assembly and the primary valve returning a portion of the lubricant to the lubricant tank when the primary valve member is between the fully opened position and the fully closed position.

2. The gas turbine engine of claim 1, further comprising an electric machine drivingly coupled to the turbo-engine shaft, wherein the lubrication system further comprises:

a primary electric machine lubricant supply line in fluid communication with the lubricant tank and the electric machine; and a secondary electric machine lubricant supply line in fluid communication with the lubricant tank and the electric machine, wherein the lubricant pump supplies the lubricant to the electric machine from the lubricant tank through the primary electric machine lubricant supply line and the secondary electric machine lubricant supply line, the lubrication system modulating a mass flow rate of the lubricant to the electric machine through at least one of the primary electric machine lubricant supply line or the secondary electric machine lubricant supply line.

3. The gas turbine engine of claim 1, further comprising one or more engine bearings that support rotation of the turbo-engine shaft, wherein the lubrication system further comprises:

a primary engine lubricant supply line in fluid communication with the lubricant tank and the one or more engine bearings; and a secondary engine lubricant supply line in fluid communication with the lubricant tank and the one or more engine bearings, wherein the lubricant pump supplies the lubricant to the one or more engine bearings from the lubricant tank through the primary engine lubricant supply line and the secondary engine lubricant supply line, the lubrication system modulating a mass flow rate of the lubricant to the gas turbine engine through at least one of the primary engine lubricant supply line or the secondary engine lubricant supply line.

4. The gas turbine engine of claim 1, wherein the plurality of gears meshes with each other at a mesh, the component of the gearbox assembly being the mesh such that the primary gearbox lubricant supply line and the secondary gearbox lubricant supply line directing the lubricant to the mesh in parallel.

5. The gas turbine engine of claim 4, wherein the primary gearbox lubricant supply line is a first primary gearbox lubricant supply and the lubrication system further comprises a second primary gearbox lubricant supply line in fluid communication with one or more bearings of the plurality of gears.

6. The gas turbine engine of claim 5, wherein the secondary gearbox lubricant supply line is a first secondary gearbox lubricant supply line and the lubrication system further comprises a second secondary gearbox lubricant supply line in fluid communication with the one or more bearings.

7. The gas turbine engine of claim 1, wherein the gearbox includes one or more bearings, the component of the gearbox assembly being the one or more bearings such that the primary gearbox lubricant supply line and the secondary gearbox lubricant supply line direct the lubricant to the one or more bearings in parallel.

8. The gas turbine engine of claim 1, wherein the lubrication system further comprises a secondary valve disposed in the secondary gearbox lubricant supply line for modulating the mass flow rate of the lubricant to the gearbox assembly through the secondary gearbox lubricant supply line.

9. The gas turbine engine of claim 8, wherein the secondary valve is a shut-off valve that includes a secondary valve member that moves between an opened position and a closed position to turn on or to turn off the lubricant through the secondary gearbox lubricant supply line.

10. The gas turbine engine of claim 1, wherein the lubricant extraction volume ratio is between 0.01 and 0.3, inclusive of the endpoints, for a maximum gearbox power between 35 kHP and 90 kHP.

11. The gas turbine engine of claim 10, wherein the lubricant extraction volume ratio is between 0.03 and 0.3, inclusive of the endpoints, for a maximum gearbox power less than 35 kHP.

12. The gas turbine engine of claim 1, wherein the lubrication system includes one or more lubricant supply lines in fluid communication with the lubricant pump, wherein the primary gearbox lubricant supply line and the secondary gearbox lubricant supply line branch from the one or more lubricant supply lines to the component of the gearbox assembly in parallel.

13. A gas turbine engine comprising:

a turbo-engine including a compressor section, a combustion section, and a turbine section, the turbo-engine having a turbo-engine shaft that couples the compressor section to the turbine section;

a fan section having a fan shaft;

a gearbox assembly, the fan shaft being drivingly coupled to the turbo-engine shaft through the gearbox assembly, the gearbox assembly comprising:

a gearbox including a plurality of gears that mesh with each other at a mesh and having a gearbox volume defined by an outer diameter of the gearbox and a gearbox length of the gearbox; and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the end points, the lubricant extraction volume ratio defined by:

$$\frac{V_G}{V_{GB}}$$

wherein $V_G$ is the gutter volume of the gutter and $V_{GB}$ is the gearbox volume; and a lubrication system comprising:

a lubricant tank that stores lubricant therein;

a primary gearbox lubricant supply line in fluid communication with the lubricant tank, wherein the primary gearbox lubricant supply line directs the lubricant to the mesh;

a secondary gearbox lubricant supply line in fluid communication with the lubricant tank in parallel with the primary gearbox lubricant supply line, wherein the secondary gearbox lubricant supply line directs the lubricant to the mesh;

one or more valves disposed in at least one of the primary gearbox lubricant supply line or the secondary gearbox lubricant supply line, the one or more valves including a primary valve disposed in the primary gearbox lubricant supply line, the primary valve including a primary valve member that moves between a fully opened position and a fully closed position to modulate a mass flow rate of the lubricant through the primary gearbox lubricant supply line to the mesh and returns a portion of the lubricant to the lubricant tank when the primary valve member is between the fully opened position and the fully closed position; and a lubricant pump for supplying the lubricant to the mesh from the lubricant tank through the primary gearbox lubricant supply line and the secondary gearbox lubricant supply line in parallel.

14. The gas turbine engine of claim 13, further comprising an electric machine drivingly coupled to the turbo-engine shaft, wherein the lubrication system further comprises:

a primary electric machine lubricant supply line in fluid communication with the lubricant tank and the electric machine; and a secondary electric machine lubricant supply line in fluid communication with the lubricant tank and the electric machine, wherein the lubricant pump supplies the lubricant to the electric machine from the lubricant tank through the primary electric machine lubricant supply line and the secondary electric machine lubricant supply line, the lubrication system modulating a mass flow rate of the lubricant to the electric machine through at least one of the primary electric machine lubricant supply line or the secondary electric machine lubricant supply line.

15. The gas turbine engine of claim 13, further comprising one or more engine bearings that support rotation of the turbo-engine shaft, wherein the lubrication system further comprises:

a primary engine lubricant supply line in fluid communication with the lubricant tank and the one or more engine bearings; and a secondary engine lubricant supply line in fluid communication with the lubricant tank and the one or more engine bearings in parallel with the primary engine lubricant supply line, wherein the lubricant pump supplies the lubricantto the one or more engine bearings from the lubricant tank through the primary engine lubricant supply line and the secondary engine lubricant supply line in parallel, the lubrication system modulating a mass flow rate of the lubricant to the one or more engine bearings through at least one of the primary engine lubricant supply line or the secondary engine lubricant supply line.

16. The gas turbine engine of claim 13, wherein the one or more valves include a secondary valve disposed in the secondary gearbox lubricant supply line for modulating the mass flow rate of the lubricant to the gearbox assembly through the secondary gearbox lubricant supply line.

17. The gas turbine engine of claim 13, wherein the lubricant extraction volume ratio is between 0.01 and 0.3, inclusive of the endpoints, for a maximum gearbox power between 35 kHP and 90 kHP.

18. The gas turbine engine of claim 17, wherein the lubricant extraction volume ratio is between 0.03 and 0.3, inclusive of the endpoints, for a maximum gearbox power less than 35 kHP.

* * * * *